US012384593B2

(12) United States Patent
Whitehurst

(10) Patent No.: US 12,384,593 B2
(45) Date of Patent: Aug. 12, 2025

(54) BAND-DRIVEN PACKAGING

(71) Applicant: Burgopak Limited, London (GB)

(72) Inventor: Dane Whitehurst, London (GB)

(73) Assignee: BURGOPAK LIMITED, London (GB)

( * ) Notice: Subject to any disclaimer, the term of this patent is extended or adjusted under 35 U.S.C. 154(b) by 0 days.

(21) Appl. No.: 17/787,268

(22) PCT Filed: Dec. 18, 2020

(86) PCT No.: PCT/GB2020/053300
§ 371 (c)(1),
(2) Date: Jun. 17, 2022

(87) PCT Pub. No.: WO2021/123818
PCT Pub. Date: Jun. 24, 2021

(65) Prior Publication Data
US 2023/0048048 A1 Feb. 16, 2023

(30) Foreign Application Priority Data
Dec. 19, 2019 (GB) ..................................... 1918914
Mar. 12, 2020 (GB) ..................................... 2003619

(51) Int. Cl.
*B65D 5/38* (2006.01)
*B31B 50/62* (2017.01)
(Continued)

(52) U.S. Cl.
CPC .............. *B65D 5/38* (2013.01); *B31B 50/624* (2017.08); *B65D 5/6617* (2013.01); *B31B 2120/60* (2017.08)

(58) Field of Classification Search
CPC .......... B65D 27/00; B65D 2/04; B65D 23/14; B65D 27/14; B65D 27/30; B65D 27/38;
(Continued)

(56) References Cited

U.S. PATENT DOCUMENTS 1,295,833 A * 3/1919 Allen ..................... B65D 27/08
229/72
1,405,002 A * 1/1922 Rhodes ................ B65D 5/4204
229/125.21
(Continued)

FOREIGN PATENT DOCUMENTS

CA 2639984 A1 7/2007
CN 101437724 A 5/2009
(Continued)

OTHER PUBLICATIONS

Burgopak Packaging—Best Of 2019. Published Jan. 22, 2020. Visited Oct. 13, 2021. https://www.youtube.com/watch?v=KyePV6xWUvs (Year: 2020).
(Continued)

*Primary Examiner* — Steven A. Reynolds
*Assistant Examiner* — Prince Pal
(74) *Attorney, Agent, or Firm* — Stoel Rives LLP

(57) ABSTRACT

A package insert comprises: first and second members; and a band. The first and second members are coupled to the band, such that movement of the first member in a first direction drives the band to cause movement of the second member in a second direction. The first member comprises a primary portion and an attachment portion that is configured to detachably couple the primary portion to the band.

14 Claims, 17 Drawing Sheets

(51) Int. Cl.
*B31B 120/60* (2017.01)
*B65D 5/66* (2006.01)

(58) Field of Classification Search
CPC ...... B65D 79/00; B65D 5/5213; B65D 27/26; B65D 27/28; B65D 27/34
USPC ...... 229/68.1, 69–76, 79–82, 300–316, 92.8, 229/87.05, 927, 928
See application file for complete search history.

(56) References Cited

U.S. PATENT DOCUMENTS 1,684,105 A * 9/1928 Olm ...................... B65D 27/04 229/72
1,895,486 A * 1/1933 Overly .................. B65D 27/08 229/72
2,055,716 A * 9/1936 Berkowitz ............ B65D 27/04 229/72
3,180,487 A 4/1965 Rikard
3,206,101 A 9/1965 Holmes
3,498,446 A * 3/1970 Lafreniere .......... B65D 5/4208 229/162.6
D225,588 S 12/1972 Testro et al.
D229,485 S 12/1973 Petersen
D232,081 S 7/1974 Zine
4,354,631 A * 10/1982 Stevenson ............. B65D 27/04 229/303
D271,985 S 12/1983 Belser
D285,454 S 9/1986 Paulk
D295,536 S 5/1988 Forbes
4,763,789 A * 8/1988 Questel ................. B65D 5/509 229/148
4,790,120 A * 12/1988 Manduley .......... H01R 12/7076 206/706
D299,888 S 2/1989 Maxwell
D307,242 S 4/1990 Horton
D322,455 S 12/1991 Forbes
D362,367 S 9/1995 Olsson et al.
D379,198 S 5/1997 Dowda
D386,406 S 11/1997 House
D397,935 S 9/1998 Herbst et al.
6,024,278 A * 2/2000 Martin .................. B42D 15/08 229/84
D452,267 S 12/2001 Makofsky et al.
D465,305 S 11/2002 Thorpe et al.
6,557,700 B1 * 5/2003 Wharton ............ G11B 33/0444 206/745
6,698,586 B2 3/2004 Sankey et al.
D503,884 S 4/2005 Camilleri-Oller et al.
D526,896 S 8/2006 Partida
7,159,717 B2 * 1/2007 Aldridge ................ B65D 5/321 206/800
D536,375 S 2/2007 Potter et al.
D541,647 S 5/2007 Ashby et al.
D543,102 S 5/2007 Ashby et al.
D548,074 S 8/2007 El-Afandi
D553,986 S 10/2007 Berger
D564,926 S 3/2008 Cherneff et al.
D574,281 S 8/2008 Cherneff et al.
7,451,909 B2 * 11/2008 Sexton ..................... B43M 3/00 229/128
D591,341 S 4/2009 Fagan
D602,516 S 10/2009 Miller et al.
D606,121 S 12/2009 Miller et al.
D611,994 S 3/2010 Lanman et al.
D613,171 S 4/2010 Sempe
D616,737 S 6/2010 Britt et al.
D619,477 S 7/2010 Frizell et al.
D625,757 S 10/2010 Schluger
7,857,196 B1 12/2010 Gorman
7,926,656 B2 4/2011 Hinds
D641,579 S 7/2011 Wynalda et al.
D646,917 S 10/2011 Wynalda et al.
D646,918 S 10/2011 Wynalda et al.
8,256,194 B2 * 9/2012 Brown ................... B65D 27/00 493/917
8,403,133 B2 3/2013 Lien
D700,524 S 3/2014 Ferriter
D719,845 S 12/2014 Lee
D736,613 S 8/2015 Bowman
D740,649 S 10/2015 Evans et al.
D747,193 S 1/2016 Melistas
D750,478 S 3/2016 Kiss
9,290,033 B2 * 3/2016 Russell ................... B31B 70/00
D766,713 S 9/2016 Kiss
D768,476 S 10/2016 Moilanen
D768,478 S 10/2016 Glass et al.
D770,299 S 11/2016 Andrews
D772,567 S 11/2016 Tappeiner
D773,181 S 12/2016 Tappeiner
D799,852 S 10/2017 Pena
D802,661 S 11/2017 Salatandre
D810,562 S 2/2018 Augusyniak et al.
D814,563 S 4/2018 Bartos
D814,916 S 4/2018 Hoekstra et al.
D828,869 S 9/2018 Bell
D830,848 S 10/2018 Sale et al.
D836,715 S 12/2018 Wang et al.
D844,714 S 4/2019 Witze
D845,759 S 4/2019 Arzano
D855,457 S 8/2019 D'Agnone
D860,311 S 9/2019 Sindo et al.
D866,312 S 11/2019 Ito
D866,322 S 11/2019 Bennett et al.
D869,959 S 12/2019 Huang et al.
D874,921 S 2/2020 Zhao
D878,458 S 3/2020 Narayan et al.
D883,084 S 5/2020 Sinclair et al.
D884,071 S 5/2020 Baker
D887,106 S 6/2020 Karp et al.
D889,957 S 7/2020 Sølling
D891,267 S 7/2020 In et al.
D908,794 S 1/2021 Houle
D909,862 S 2/2021 Gray
D913,785 S 3/2021 Kelly
D915,677 S 4/2021 Pan
D931,736 S 9/2021 Phillips-Moul et al.
11,235,904 B2 * 2/2022 Whitehurst ............ B65D 27/04
D966,090 S * 10/2022 Whitehurst .............. B65D 5/20 D9/416
2003/0230626 A1 * 12/2003 Rones .................... B65D 27/34 229/72
2006/0006080 A1 1/2006 Gustafsson et al.
2006/0278687 A1 * 12/2006 Sexton ................. B42D 15/045 229/92.8
2008/0156686 A1 * 7/2008 Hluchan .................. B65D 5/38 206/528
2010/0044258 A1 2/2010 Siecke
2010/0230316 A1 * 9/2010 Wharton ............ G11B 33/0494 206/468
2012/0152766 A1 * 6/2012 Mazurek .................. B65D 5/38 229/125.125
2013/0306715 A1 11/2013 James et al.
2014/0151442 A1 * 6/2014 Gilbertson ................ B42F 7/00 229/67.3
2014/0191023 A1 * 7/2014 Emmott ................. B65D 27/34 229/300
2014/0216982 A1 8/2014 Boyer
2015/0028091 A1 * 1/2015 Spaulding .............. B65D 27/08 229/92.8
2016/0263933 A1 * 9/2016 Gilbertson ............. B65D 27/08
2019/0150506 A1 * 5/2019 Matranga ................ A24F 23/02
2020/0290766 A1 9/2020 Whitehurst
2020/0290769 A1 * 9/2020 Uyeda .................... B65D 23/14

FOREIGN PATENT DOCUMENTS

EP 1140639 A1 10/2001
GB 1134745 A 11/1968
GB 2490524 A 11/2012

(56) References Cited

FOREIGN PATENT DOCUMENTS

| | | | |
|---|---|---|---|
| WO | 2007007094 | A1 | 1/2007 |
| WO | 2010015638 | A1 | 2/2010 |
| WO | 2010018416 | A2 | 2/2010 |

OTHER PUBLICATIONS

Easy-Fold Mailers. Posted on Envelopes.com. Web Archive capture date Mar. 6, 2016. Visited Oct. 13, 2021. https://web.archive.org/web/2016030616414 7 /http :/www.envelopes.com/shipping/boxes/easy-fold-mai lers-10-1-4-x-8-1-4-x-1-1-4-white (Year: 2016).

NsideN26—Crafting a premium card experience. Published Feb. 8, 2018. Visited Oct. 19, 2021. https://www.youtube.com/watch?v=bvVFiVFe 70A (Year: 2018).

Woo—SIM Card. Publication date unavailable. Visited Oct. 13, 2021. https://burgopak.com/gallery/burgopak-cabrio?index=11 (Year: 0 ).

International Searching Authority, International Search Report and Written Opinion for International PCT Application No. PCT/GB2022/053300, mailed May 31, 2021, 18 pages.

* cited by examiner

BAND-DRIVEN PACKAGING

This invention relates to a package insert, to a package and to a method of assembling a package.

Packages, including packages for containing articles and packages for containing information or other display items are frequently used as one-use disposable items, which has environmental implications. It is desirably to recycle such packages as much as possible.

However, some packages can be made of mixed materials that would come under different recycling categories. Such packages cannot be recycled as a single unit, but must be recycled as separate components. This is the case, for example, with band-driven package, which commonly feature of band of plastics materials used to drive components made of other non-plastics materials, such a cardboard.

In such band driven packages, it is necessary to ensure the band and other components are securely fastened together, so that the package can withstand ordinary wear and tear. It is also desirable to hide the band component from view, and hence from easy access, so that the underlying mechanism of the package cannot be easily seen. Whilst this results in a sturdy package, it means the package is hard to disassemble for recycling.

Band driven packages comprise a sleeve that is divided into two compartments by a divider. Structural rigidity of the two compartments is desirable to protect the contents of the package. This can be achieved by using a rigid or at least relatively stiff material for the components. However, such rigid or stiff material may be particularly difficult to break apart for recycling purposes.

It is an object of this invention to address at least one of the problems described above.

STATEMENTS OF THE INVENTION

Against this background, the invention resides in a package insert comprising first and second members and a band. The first and second members are coupled to the band, such that movement of the first member in a first direction drives the band to cause movement of the second member in a second direction. The first member comprises a primary region and an attachment region that is configured to detachably couple the primary region to the band.

The attachment region may be configured to be detachable from the band so that the attachment region and the primary region may be detachable form the band. Alternatively, the attachment region may be configured to be detachable from the primary region so as to decouple the primary region from the band and the attachment region.

The first member may be movable between a closed configuration in which the first member has been displaced in the first direction to a minimum possible extent, and an open position in which the first member has been displaced in the first direction to a maximum possible extent.

The attachment region may be configured to be detachable from the band and/or from the primary region when the package is arranged in the open configuration and a force is applied to the first member in the first direction.

The attachment region may be frangibly coupled to the primary region. To this end, a boundary between the attachment region and the primary region may be defined by a perforation or score.

The primary region may comprise an aperture and the attachment region may protrude into the aperture to anchor the primary region to the attachment region. The attachment region may be fitted to the aperture of the primary region with a press-fit.

The attachment region may comprise an attachment feature for attaching the first member to the band.

The attachment feature may comprise an opening and an anchoring feature adjacent to the opening. An end of the band may protrude through the opening to define an attachment loop. The anchoring feature may protrude into the attachment loop.

The anchoring feature may comprise a flap.

The first member may comprise a double wall. The flap may be provided on a first wall of the double wall and the opening being defined in a second wall of the double wall The flap may be defined by a hinged portion of the first wall.

The hinged portion of the second wall may reveal a further opening when the flap is opened.

The second member may comprise an attachment portion that is detachably coupled to the band. All features described above in relation to the first member may apply in respect of the second member also.

The first member and the band may be made of different materials, optionally materials that have different recycling categories. For example, the band may comprise a plastics material and the first member may comprise a non-plastics material, such as cardboard.

The anchoring feature may comprise two flaps arranged to face generally towards each other to protrude into the attachment loop from opposite directions.

The packaging insert may further comprise a panel, the band encircling the panel.

The invention also extends to a package comprising the package insert above.

The package may comprise a sleeve, the package insert being housed within the sleeve, such that the sleeve is arranged to selectively block access to the first member. The sleeve and the panel of the insert may be contiguous, for example being formed together from a single piece, such as a blank. In other examples, the sleeve and the panel of the insert may be separate components.

The invention extends further to a package comprising a first member, a sleeve for selectively blocking access to the first member and a drive component for driving the first member out of the sleeve. The drive component and the first member are made of different materials, and the first member is detachably coupled to the drive component.

The invention extends still further to a method of assembling a packaging insert, the packaging insert comprising first and second members and a band, the first member comprising an attachment feature for detachably coupling the first member to the band, the attachment feature comprising an opening and an anchoring feature adjacent to the opening, the method comprising: feeding an end of the band through the opening to define an attachment loop, and inserting the anchoring feature into the attachment loop to couple the first member to the band.

From another aspect, the invention resides in a package insert comprising: a substrate encircled by a band, and a moveable member couplable to the band, such that movement of the moveable member in a first direction drives the band around the substrate. The moveable member comprises a running surface configured to lie parallel to and facing the substrate, and a recess for accommodating an adhesive material for coupling the moveable member to the band, such that the adhesive material lies flush or sub-flush with the running surface.

The recess may comprise a base that is recessed from the running surface, so as to form a depression or indentation in the running surface. The package insert may comprise an adhesive material accommodated in the recess, wherein the adhesive material lies flush or sub-flush with the running surface. In other words, the adhesive material may be provided in the recess such that the adhesive material does not protrude or project above the running surface of the moveable member.

Accommodating the adhesive material in the recess so that it lies flush or sub-flush with the running surface is advantageous, as it guards against the adhesive material transferring to the band or other components of the package before it is intended, which could otherwise lead to the moveable catching on the band and thus prevent the moveable member from running smoothly over the band. In the finished package, this feature also ensures that the or each moveable member can lie flat against the substrate, without being spaced away from the substrate in the region of the adhesive.

The moveable member may be coupled to the band by the adhesive material.

The moveable member may comprise first and second walls that are parallel and in contact.

The moveable member may comprise a recess region. In the recess region, the first wall may comprise an aperture and the second wall may be continuous, such that the first and second walls together define the recess in the moveable member.

The second wall may define a base of the recess.

The package insert may comprise a further moveable member that is couplable to the band such that movement of the further moveable member in a second direction drives the band around the substrate.

The invention also resides in a package comprising the package insert of any preceding paragraph.

The invention further resides in a package comprising a substrate encircled by a band and a moveable member coupled to the band by an adhesive material, such that movement of the moveable member in a first direction drives the band around the substrate. The moveable member comprises a running surface configured to lie parallel to and facing the substrate and a recess that accommodates the adhesive material such that the adhesive material lies flush or sub-flush with the running surface.

The recess may comprise a base that is recessed or set back from the running surface.

A spacing between the running surface and the base may define a depth of the recess, and a depth of the adhesive material may not exceed the depth of the recess. In this way, the adhesive material is fully contained within the recess, and does not protrude or project above the running surface of the moveable member. This prevents accidental transfer of the adhesive material to other components of the package before it is intended.

The invention further resides in a method of making the package described above. The method comprises: providing a moveable member comprising a running surface and a recess in the running surface; arranging an adhesive material in the recess such that the adhesive material lies flush or sub-flush with the running surface; arranging the moveable member so that the adhesive material faces a band; applying pressure to the band and/or moveable member in the region of the adhesive material to adhere the moveable member to the band.

The method may comprise arranging the band and the moveable member in a sleeve, and applying pressure to the band and/or the moveable member in the region of the adhesive material via the sleeve.

The method may comprise arranging the band in the sleeve before arranging the moveable member in the sleeve.

In this way, the invention allows for the sleeve and band of the package to be assembled, and for the or each moveable member to be subsequently incorporated into the package, simply by inserting the or each member into the package and applying pressure to the package, i.e. by pinching the package between the thumb and forefinger, so as to attach the moveable member(s). That is, the sleeve and band assembly may be pre-fabricated, before retrofitting the moveable member(s) in the package simply by inserting them into the sleeve and applying pressure in the appropriate region(s) by squeezing, pinching or pressing the sleeve.

The method may comprise arranging the band around a substrate. The method may comprise arranging the band around the substrate before adhering the moveable member to the band.

The substrate may be formed as a separate piece from the sleeve, which is attachable to the sleeve in order to form a package.

In other embodiments the substrate and the sleeve may be formed from a continuous piece.

The substrate and sleeve may be formed of a blank comprising a sleeve portion and a substrate portion. The method may comprise: arranging a band to encircle the substrate portion of the blank, and subsequently folding the sleeve portion of the blank around the substrate portion, to house the substrate in the sleeve; and arranging the moveable member in the sleeve such that the adhesive material faces the band.

The method may comprise: providing a further moveable member comprising a running surface and a recess in the running surface; arranging an adhesive material in the recess of the further moveable member, such that the adhesive material lies flush or sub-flush with the running surface of the further moveable member; arranging the band over the adhesive in the recess of the further moveable member; applying pressure to the band and/or further moveable member in the region of the adhesive material to adhere the further moveable member to the band.

Pressure may be applied to the moveable member and the further moveable member simultaneously. For example, a user may hold the package in both hands, and pinch the package in the region of the adhesive material of the moveable member and the further moveable member at the same time.

The invention further resides in a method of making the package of any of the preceding paragraphs, comprising: providing a sleeve and a substrate housed in the sleeve, the substrate being encircled by a band; providing a moveable member comprising a running surface and a recess in the running surface; arranging an adhesive material in the recess such that the adhesive material lies flush or sub-flush with the running surface; arranging the moveable member in the sleeve such that the adhesive material faces the band; applying pressure to the sleeve in the region of the adhesive material to adhere the moveable member to the band.

The substrate and sleeve may be formed of a blank comprising a sleeve portion and a substrate portion, and the step of providing a sleeve and a substrate housed in the sleeve may comprise arranging a band to encircle the substrate portion of the blank, and folding the sleeve portion of the blank around the substrate portion.

From another aspect, the invention resides in a sleeve blank for forming a sleeve for housing first and second members. The sleeve blank comprises a lower panel for forming a base of the sleeve; a upper panel for forming a top of the sleeve; a divider panel for dividing a space between the lower panel and the upper panel into lower and upper compartments; a first side wall joining a first edge of the lower panel to a first edge of the divider panel; a second side wall joining a second edge of the lower panel to a second edge of the upper panel; and a protrusion that protrudes from the first side wall beyond the first edge of the divider to support a first edge of the upper panel in the assembled sleeve.

The first side wall may define a first side wall plane, and the protrusion may protrude away from the first sidewall substantially in the first side wall plane.

The first side wall may have a first wall height $h_1$, the protrusion may have a protrusion height $h_p$, and the second side wall may have a second wall height $h_2$ that is approximately equal to the sum of the first wall height $h_1$ and the protrusion height $h_p$.

The second wall height $h_2$ may be approximately equal to the protrusion height $h_p$.

The first side wall may be joined to the divider panel by a foldable boundary, and the protrusion may extend beyond the foldable boundary.

A boundary between the protrusion and the divider panel may be defined by a cut.

The divider panel may comprise a cut-out adjacent to the foldable boundary that accommodates the protrusion when the blank is in an unfolded configuration.

The cut-out in the divider panel may be substantially the same shape as the protrusion.

The protrusion may comprise a first edge joined to the first sidewall and a second edge opposite the first edge, the second edge being a free edge.

A length of the first edge may be greater than a length of the second edge.

The protrusion may comprise third and fourth edges joining the first and second edges. The third and fourth edges may be sloped to define an acute angle to the first edge and an obtuse angle to the second edge.

The protrusion may be continuous with the first side wall.

The sleeve blank may further comprise a secondary lower panel and a third side wall joining the upper panel to the secondary lower panel.

The sleeve blank may comprise a plurality of protrusions that protrude from the first side wall beyond the first edge of the divider to support a first edge of the upper panel in the assembled sleeve.

The invention also extends to a sleeve comprising the sleeve blank of any preceding claim, arranged in a folded configuration such that the lower panel, upper panel and divider panel are substantially parallel.

The invention extends further to a package comprising the sleeve described above, a first member arranged in the lower compartment of the sleeve; and a second member arranged in the upper compartment of the sleeve.

The package may comprise a band encircling the divider, the first and second members being coupled to the band.

Optional and advantageous features of this aspect of the invention are set out in the appended claims. It will be appreciated that optional and/or preferred features of each aspect may be used alone or in appropriate combination with the other aspect also.

BRIEF DESCRIPTION OF THE FIGURES

In order that the invention may be more readily understood, reference will now be made, by way of example, to the accompanying drawings, in which.

DETAILED DESCRIPTION OF EMBODIMENTS OF THE INVENTION

Figure 1:
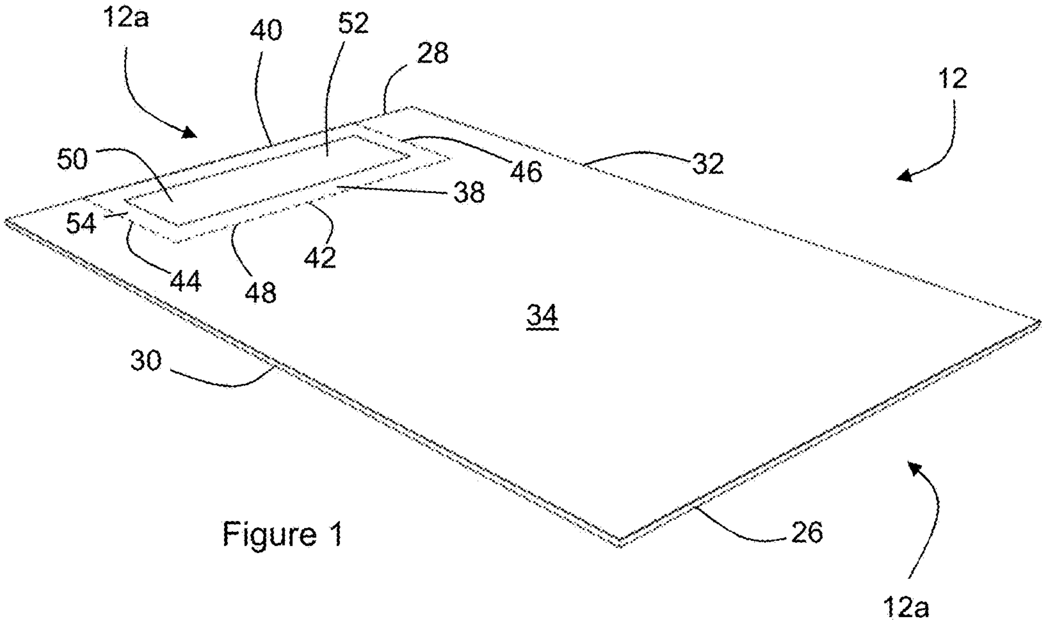
FIG. 1 is a perspective view of a latchable package according to an embodiment of the invention in a first or secured configuration.
Figure 2:
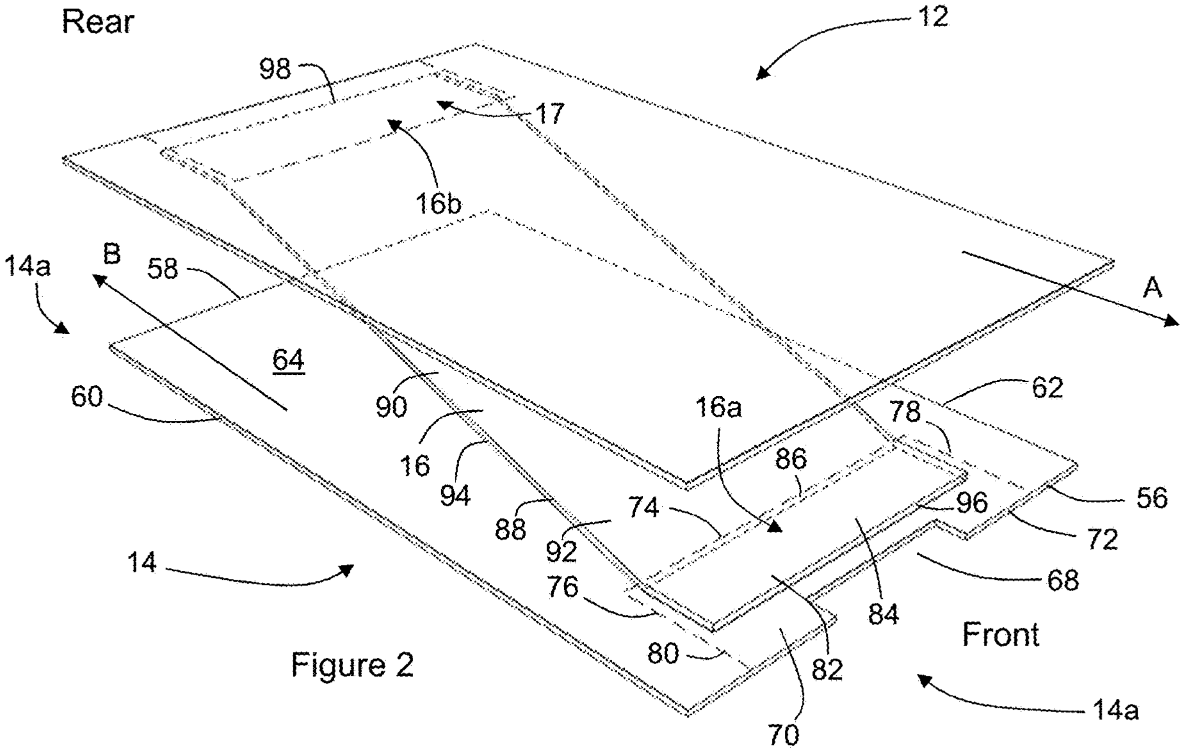
FIG. 2 is a perspective view of the latchable package of FIG. 1 in a second or access configuration.
Figure 3:
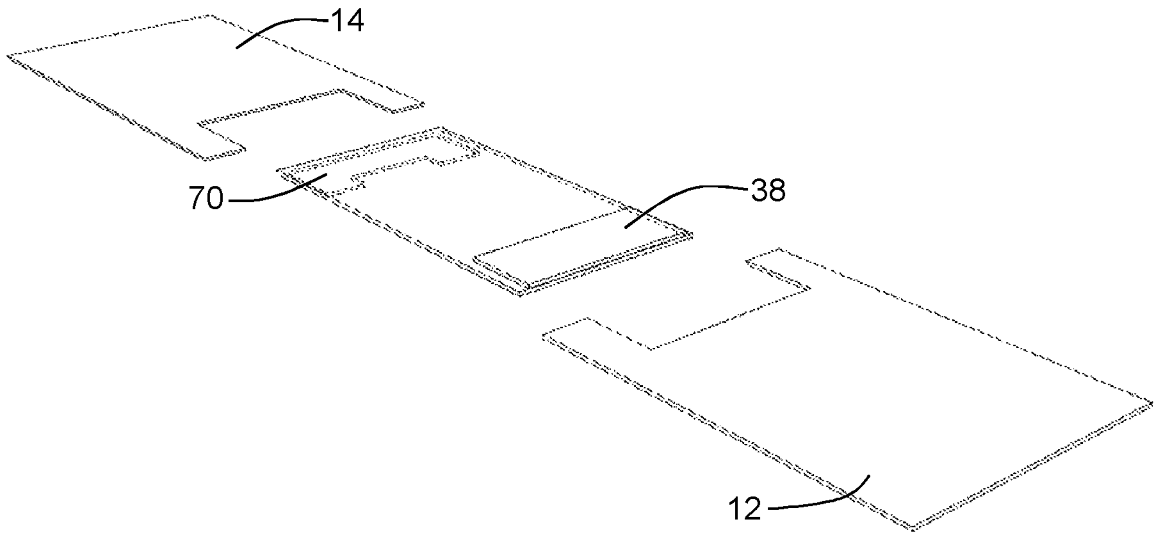
FIG. 3 is a perspective view of a latchable insert, a support and a structure that constitute disassembled components of the package of FIG. 1.

FIGS. 1 to 3 illustrate an arrangement in the form of a package insert for use in a package such as that described in the Applicant's European Patent Application, EP1140639.

The arrangement includes a first member 12 and a second member 14 that are coupled to one another via a drive member 16 or component in the form of a band. When incorporated into a package the arrangement may be housed in a sleeve 18, with the band 16 arranged to encircle a divider 20 that defines a first chamber 22 and a second chamber 24 within the sleeve 18 of the package, and the first and second members 12, 14 housed in the first and second chambers 22, 24 respectively, when the package is in a closed position. The package is configured such that movement of the first member 12 in a first direction out of the sleeve 18 drives movement of the second member 14 in a second, opposing, direction out of the sleeve 18.

Referring now to FIG. 1 in particular, the first member 12 is a substantially flat panel having a front end 12*a* and a rear end 12*b*, and comprising a front edge 26, a rear edge 28, a left edge 30, a right edge 32, an upper surface (not shown) and a lower surface 34.

The first member comprises an attachment region comprising a first tear region 38 a first bonding region and a primary region that forms the remainder of the first member. The attachment region defines a portion of the first member 12 that can be pulled away from the remainder of the first member 12, i.e. the primary region, with ease on application of a force by a user. As will be explained, the attachment region is configured to detachably couple the primary region of the first member to the band. This attachment region 38 is beneficial, as it allows the different components of the arrangement to be separated from one another more easily than would otherwise be possible, for easy recycling of the arrangement. For example, in this arrangement the attachment region allows for the cardboard primary regions of the first and second members to be completely separated from the plastic band.

The first tear region 38 is rectangular in shape in this example, although the first tear region 38 may be other shapes in other embodiments. The first tear region 38 includes a rear edge 40, a front edge 42, a left edge 44 and a right edge 46. In this embodiment, the rear edge 40 of the first tear region 38 is defined by a central portion of the rear edge 28 of the first member 12, and a first perforation 48 defines the front, left and right edges 42, 44, 46 of the first tear region 38. In this way, the attachment region of the first member is frangibly coupled to the primary region of the first member.

The first bonding region 50 is provided in the first tear region 38 of the first member 12. The first bonding region 50 comprises a first adhesive strip 52 that attaches the first member 12 to the band 16 when the arrangement is assembled, as is illustrated in FIG. 2. The first adhesive strip 52 is rectangular in this embodiment, and is provided generally centrally in the first tear region 38. The first adhesive strip 52 is dimensioned so as to be contained entirely within the first tear region 38 when attached to the first member 12, with a first peripheral gap 54 provided between edges of the first adhesive strip 52 and the first tear region 38. The adhesive is ideally fully contained within the first tear region such that no adhesive is on the primary region of the first member when the arrangement is disassembled to enable quick and easy recycling of the first member.

Referring now to FIG. 2, the second member 14 is also a substantially flat panel having a front end 14*a* and a rear end 14*b*, and comprising a front edge 56, a rear edge 58, a left edge 60, a right edge 62, an upper surface 64 and a lower surface (not shown).

The front edge 56 of the second member 14 comprises a rectangular cut-out region 68 provided centrally along the width of the second member defined between its left and right edges 60, 62.

The second member 14 comprises an attachment region comprising a second tear region 70 and a second bonding region, and a primary region that forms the remainder of the second member. In a similar manner for the first member, the attachment region of the second member defines a portion of the second member 14 that can be pulled away from the primary region of the second member 14 with ease on application of a force by a user. The attachment region of the second member is thus configured to detachably couple the primary region of the second member to the band.

The second tear region 70 includes a front edge 72, a rear edge 74, a left edge 76 and a right edge 78. The front edge 72 of the second tear region 70 is defined by a central portion of the front edge 56 of the second member 14, and encompasses the portion of the front edge 56 that defines the rectangular cut-out 68. A second perforation 80 defines the rear, left and right edges 74, 76, 78 of the second tear region 70.

A second bonding, or attachment, region 82 is provided in the second tear region 70 of the second member 14. The second bonding region 82 comprises a second adhesive strip 84 that attaches the second member 14 to the band 16 when the arrangement is assembled, as illustrated in FIG. 2. The second adhesive strip 84 is rectangular in this embodiment, and is dimensioned so as to be contained entirely within the second tear region 70 when attached to the second member 14, with a second peripheral gap 86 between edges of the second adhesive strip 84 and the second tear region 70.

Still referring to FIG. 2, the band, or belt member 16, comprises a strip of sheet material joined at its ends to form a continuous loop. The band 16 includes an interior surface 88 that defines an inner volume in which the divider 20 is received in use, and an exterior surface 90 that faces away from the inner volume. As illustrated in FIG. 2, when incorporated in the arrangement of this embodiment, the band 16 is arranged such that it generally defines a rectangle in plan view (see FIG. 11), and comprises upper and lower halves 92, 94 joined by front and rear edges 96, 98 provided at front and rear ends 16*a*, 16*b* of the band 16. The sheet material is typically a low-friction material, such as plastics film, that is selected so that the band 16 slides easily about the divider 20 when the arrangement is incorporated into a package for use.

When the arrangement is assembled as shown in FIG. 2, the first or front end 16*a* of the band 16 is bonded to the first member 12 at the first bonding region 50, and the second or rear end 16*b* of the band 16, i.e., a portion 17 of the band, is bonded to the second member 14 at the second bonding region 82. In this way, the first member 12 and the second member 14 are coupled to one another via the band 16.

When the arrangement is integrated into a package, the band 16 is arranged to encircle the divider 20 of the package, which divides a tubular passage formed by the sleeve into a first, or upper, passage 100 which contains the first member 12 and a second, or lower, passage 102 which contains the second member 14. When a user pulls the first member 12 out of the sleeve 18 in a first direction, the first member 12 causes the band 16 to turn about the divider 20, since the first member 12 is secured to the band 16 at the first bonding region 50. Movement of the band 16 about the divider 20 causes the second member 14 to move in a second direction, opposed to the first direction, since the second member 14 is attached to the band 16 at the second bonding region 82.

When the bonding regions 50, 82 reach the ends of the divider 20, the first member 12 can be pulled no further in the first direction, and the package is in the fully open position, with the first and second members 12, 14 both extending out of the sleeve 18.

When the user pushes the first member 12 in the second direction, the first member causes the band 16 to turn about the divider 20 such that the second member 14 moves in the first direction, back into the sleeve 18. When the first and second bonding regions 50, 82 reach the opposite ends of the divider 20, the first member 12 can be pushed no further into the package, and the package is in the fully closed position, with the first and second members 12, 14 both housed within the sleeve 18 in the first and second chambers 22, 24, respectively.

When a package incorporating the arrangement is to be disposed of, it is advantageous for the constituent parts to be easy to separate from each other, so as to allow for the package to be quickly and easily disassembled for recycling. The arrangement of FIGS. 1 to 3 enables this through incorporation of the tear regions 38, 70 of the first and second members 12, 14, which allows the plastics material of the band to be separated from the cardboard material of the first and second members. In other words, the easy separation of materials having different recycling categories is enabled. When a package is to be disposed of, the user simply removes the arrangement from the package, and separates the band 16 from the first and second members 12, 14, such that the first and second members 12, 14 can be recycled together with the rest of the cardboard components of the package.

Separating the band 16 from the first and second members 12, 14, i.e. separating the components of the arrangement, may be achieved as follows. With the arrangement in the configuration shown in FIG. 2, the user grips the first member 12 at its front end 12*a* with one hand and grips the second member 14 at its rear end 14*b* with the other hand. The user then pulls the first member 12 in a first pull direction indicated by arrow A, and the second member 14 in a second pull direction indicated by arrow B, such that the first and second members 12, 14 are pulled away from one another, in opposite directions. When the band 16 extends between the first and second members 12, 14 and is taut, the user simply continues to pull until the first and second tear regions 38, 70 separate from the surrounding regions of the first and second members 12, 14, respectively. For this, the package is configured such that a greater force is required to separate the first and second members 12, 14 from the band 16, than is required to remove the first and second tear regions 38, 70, respectively, from the surrounding region of the first and second members 12, 14. Thus, when a user pulls the first and second members 12, 14 away from one another as described above, the tear regions 38, 70 separate from their respective members 12, 14 before the members 12, 14 separate from the band 16.

FIG. 3 illustrates the arrangement in a disassembled state, after the components of the arrangement have been pulled apart for disposal. As shown, the tear regions 38, 70 of the first and second members 12, 14 remain attached to the band. Thus, the first and second members 12, 14 are now ready to be recycled with other suitable cardboard components of the package, being free from the plastic material of the band 16 or any adhesive, which all remains attached to the band 16. In this example, the attachment regions of the first and second members are configured to be detachable from the primary regions of the first and second members. In other embodiments, as will be illustrated in the following, it is possible for the attachment region to instead be detachable from the band.

FIGS. 4 to 16 illustrate an arrangement and a package according to another embodiment of the invention. As in the previous embodiment, the arrangement of this embodiment is configured so as to be easily separable for disposal. Furthermore, the arrangement of this embodiment of the invention is advantageous because its features provide for easy assembly of the arrangement, thus saving time, effort and cost in the assembly process, as will be explained.

Figure 4:
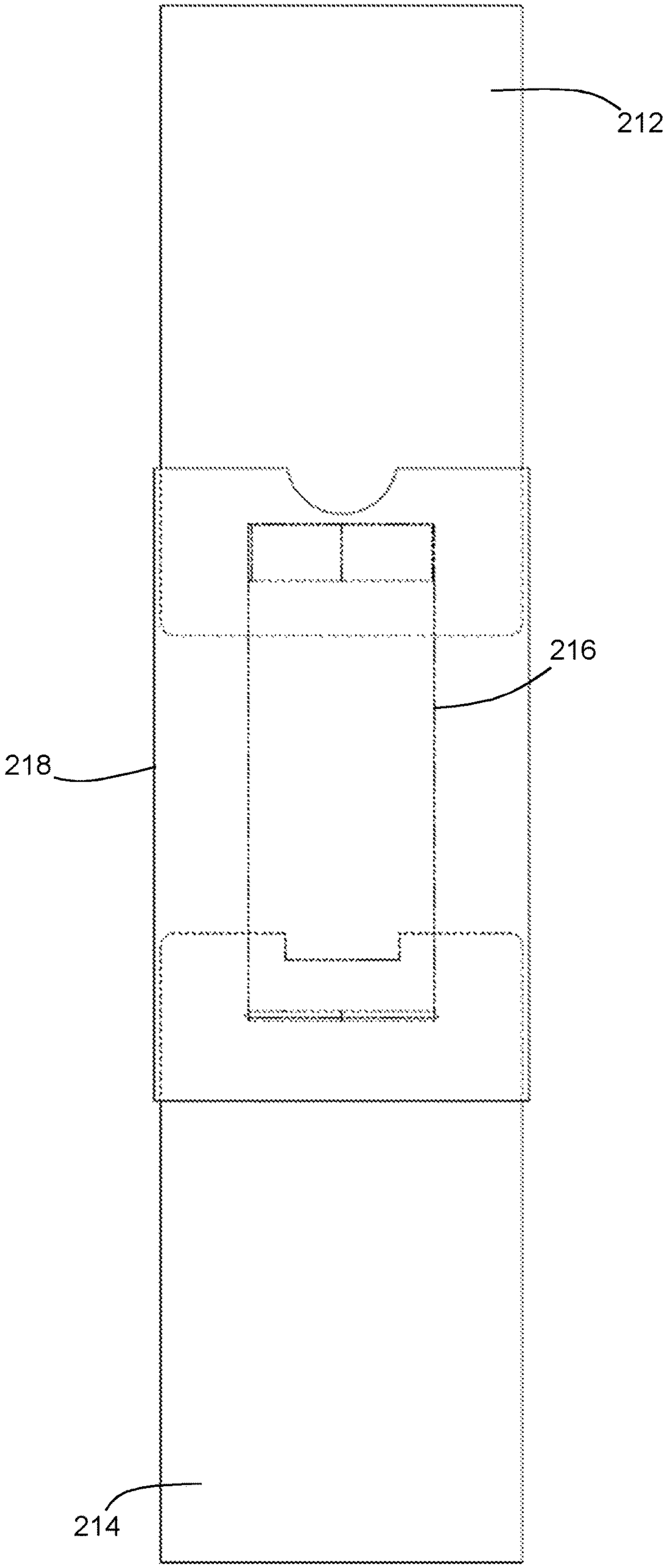
FIG. 4 is a perspective view of the latchable insert of FIG. 3.

Referring first to FIG. 4, this shows the arrangement of this embodiment incorporated into a sleeve 218 to provide a package of the invention. As in the previous embodiment, the arrangement comprises a first member 212, a second member 214 and a band 216, and is housed in a sleeve 218 when assembled in the package.

Figure 5:
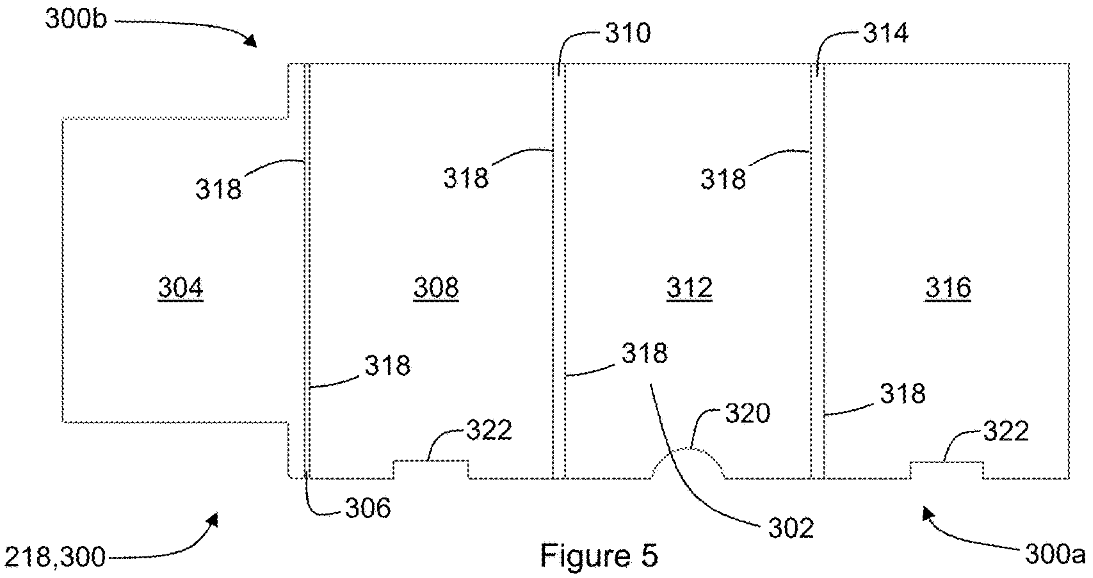
FIG. 5 is a plan view of a sleeve blank for forming a sleeve forming part of the package of FIG. 1.
Figure 6:
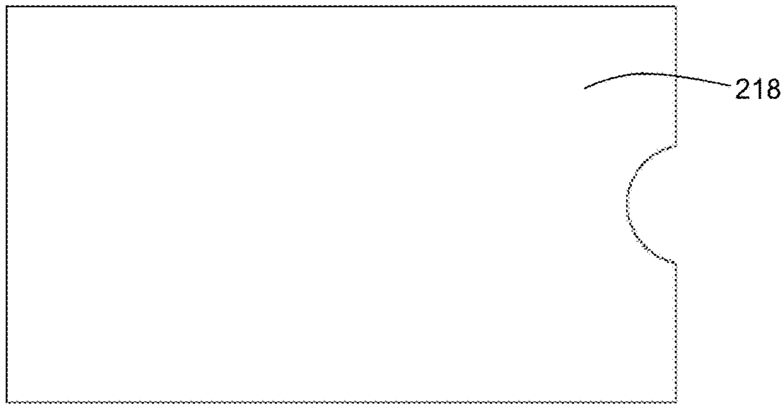
FIG. 6 is a plan view of the sleeve formed by the sleeve blank of FIG. 5.

Turning now to FIG. 5, the sleeve 218 comprises a flat blank 300, which has a first or inner surface 302 on one side and a second or outer surface (not visible in FIG. 5) on the other side. The sleeve 218 is manufactured by cutting and creasing or scoring a sheet of flexible cardboard, plastics, tear-resistant laminate, or other material. In the embodiment shown, the sleeve 218 is made from a 0.5 mm thick mineral-filled polypropylene sheet, such as that sold under the registered trade mark PRO-Print. In this way, the sheet is flexible enough to allow for the bending that is necessary to form the sleeve 218, but is stiff enough to provide structural support.

The blank 300 comprises a front end 300*a* and a rear end 300*b* and consists of seven integral, substantially oblong sections or panels 304, 306, 308, 310, 312, 314, 316, each extending from the front end 300*a* to the rear end 300*b* of the blank 300. Four of the sections, namely a divider 304, a lower inner wall 308, an upper wall 312 and a lower outer wall 316 are relatively wide, and three, namely a left inner wall 306, a right outer wall 310, and a left outer wall 314, are relatively narrow. The lower inner wall 308, the upper wall 312 and the lower outer wall 316 are of substantially the same length: that length is greater than the width of the sections in the drawings, but it need not be greater. The divider 304 is shorter in length than the lower inner wall 308, the upper wall 312 and the lower outer wall 316.

The sections 304, 306, 308, 310, 312, 314, 316 of the blank 300 are integral and demarcated from each other by folds or scores 318. The folds 318 are all made such that the first surface 302 of the flat blank 300 lies inward and the sleeve 218 is formed into a fully-folded configuration, shown in FIG. 6, by folding the flat blank 302 along the folds 332 successively in a coil-like manner, starting with the divider.

The upper wall 312 of the sleeve 218 comprises a curved indentation 320 or cut-out at the front end 300*a* of the blank 300. The lower inner and outer walls 308, 316 each comprise a rectangular indentation or cut-out 322 at the front end of the blank. When folded, the curved indentation 320 of the upper wall 312 and the rectangular indentations 322 of the lower inner and outer sections 308, 316 of the sleeve 218 are aligned with each other. In the assembled package, the curved indentation 320 may align with a curved indentation of a blister-pack housed within the package.

Figure 7:
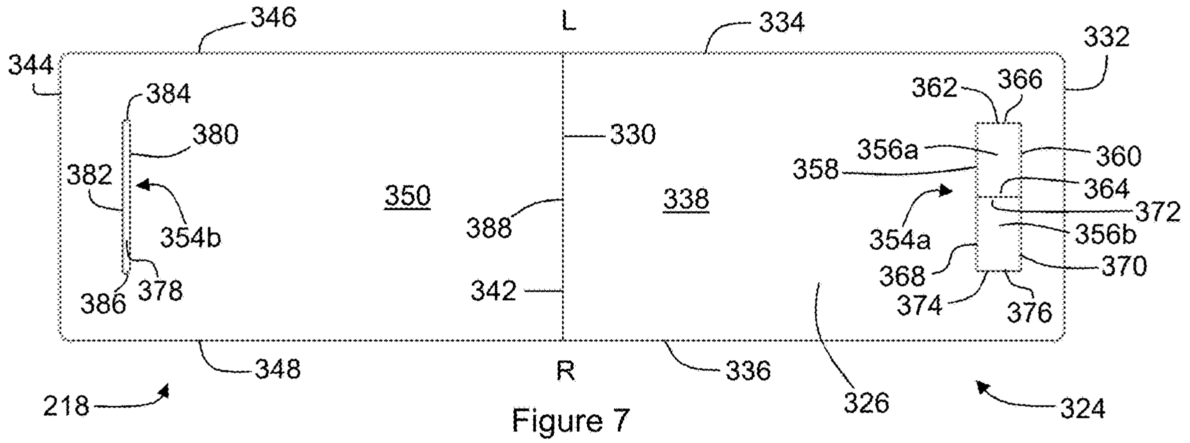
FIG. 7 is a plan view of a blank for forming another first member for use the package of FIG. 1.
Figure 8:
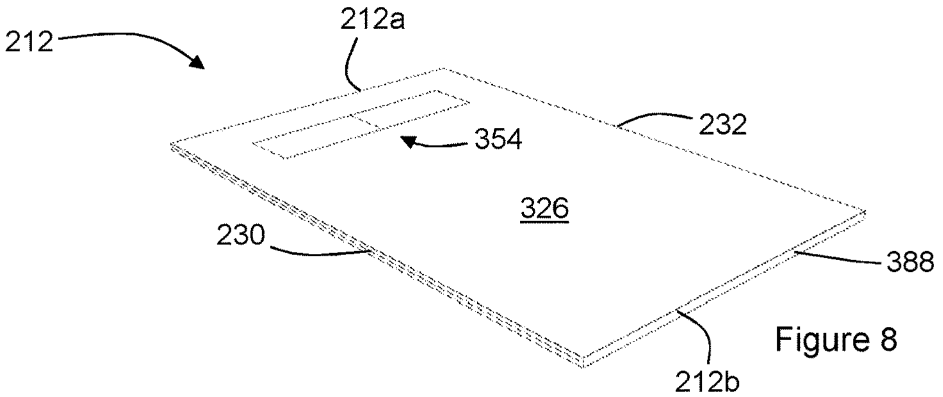
FIG. 8 is a perspective view of the first member of FIG. 7.

FIGS. 7 and 8 show the first member 212 of the arrangement of this embodiment in isolation.

Referring first to FIG. 7, the first member 212 comprises a blank 324 that includes first and second panels 326, 328, each of which are substantially planar in this embodiment. The first panel 326 has a front end 330, a rear end 332, a left side 334, a right side 336, a first or inner surface (not shown in FIG. 7) and a second or outer surface 338. Correspondingly, the second panel 328 has a front end 342, a rear end 344, a left side 346, a right side 348, a first or inner surface (not shown in FIG. 7) and a second or outer surface 350. The first and second panels 326, 328 each comprise an attachment region or portion 354*a*, 354*b*, which together define a first attachment region or portion 354 of the first member 212 when the first member 212 is formed, at which the band 216 is attached to the first member 212 when the arrangement is assembled, as will be explained. The remainder of the first member, surrounding the first attachment region, defines a primary region of the first member.

The attachment region 354*a* of the first panel 326 is located towards the rear end 332 of the first panel 326, and centrally across the width of the first panel 326 defined between the left and right side edges 334, 336 of the first panel 326. The attachment region 354*a* of the first panel comprises an attachment feature in the form of an anchoring feature 356. The anchoring feature comprises first and second flaps 356*a*, 356*b*, that are generally rectangular in shape in this embodiment, and are defined by cuts in the first panel 326. The first and second flaps 356*a*, 356*b* together extend over approximately half of the width of the first panel 326.

The first flap 356*a* comprises front and rear edges 358, 360 joined by left and right side edges 362, 364. The left side edge 362 adjoins to a surrounding region of the first panel at a first fold or score 366, also referred to as a hinged portion of the first panel. The front, rear and right side edges 358, 360, 364 are defined by first front, first rear, and side cuts in the first panel 326, such that these edges are not connected to the surrounding region of the first panel 326.

The second flap 356*b* comprises front and rear edges 368, 370 joined by left and right side edges 372, 374. The right side edge 374 adjoins to a surrounding region of the first panel 326 at a second fold or score 376, also referred to as a hinged portion of the second panel. The front, rear and left side edges 368, 370, 372 are defined by second front, second rear and the side cut in the first panel 326, such that these edges are not connected to the surrounding region of the first panel 326. The right side edge 364 of the first flap 356*a* and the left side edge 372 of the second flap 356*b* lie adjacent and are parallel to one another.

The distance between front and rear edges of the first and second flaps 356*a*, 356*b* defines a width of the attachment region 354*a* of the first panel 326. The distance between the left side edge 362 of the first flap 356*a* and the right side edge 374 of the second flap 356*b* defines a length of the attachment region 354*a* of the first panel 326. The length of the attachment region 354*a* is approximately half the width of the first panel 326.

The first and second flaps 356*a*, 356*b* are configured to be foldable between an unfolded position in which the flaps 354*a*, 354*b* are flush with the surrounding portion of the first panel 326, and a folded position in which the flaps 356*a*, 356*b* are bent or folded along the folds 366, 376, so as to extend generally perpendicularly to the plane of the first panel 326. When the flaps 356*a*, 356*b* are in the folded position, a band-receiving aperture 356 is created in the first panel 326, in the area that houses the flaps 356*a*, 356*b* in their unfolded position. In other words, the hinged portions adjoining the flaps to the primary region of the member reveal an opening in the first panel.

The attachment region 354*b* of the second panel 328 is located towards the rear end 344 of the second panel 328, and centrally across the width of the second panel 328 defined between the left and right side edges 346, 348 of the second panel 328. The attachment region 354*b* of the second panel 328 comprises an attachment feature that comprises an opening. The opening is in the form of an elongated band-receiving slot 378 defined by front and rear edges 380, 382 and left and right side edges 384, 386. The distance between front and rear edges 380, 382 of the slot 378 defines a width of the attachment region 354*b* of the second panel 328. The distance between the left and right side edges 384, 386 of the slot 378 defines a length of the attachment region 354*b* of the second panel 328. The length of the attachment region 354*b* is approximately half the width of the second panel 328.

The first and second panels 326, 328 adjoin at a blank fold or score 388 provided between their front ends 330, 342. To form the first member 212, the blank 324 is folded at the blank fold 388, and the inner surfaces 338, 350 of the first and second panels 326, 328 are bonded to each other by means of adhesive provided on one or both of the inner surfaces 338, 350. Thus, the first and second panels are arranged one on top of the other, in a face-to-face arrangement. When the first member is formed, the first and second panels are coplanar to define a double wall, with the first panel defining a first wall and the second panel defining a second wall.

When formed, the front and rear ends and the left and right sides of the first and second panels 326, 328 align to form front and rear ends 212*a*, 212*b* and left and right sides 230, 232 of the first member 212, respectively, as shown in FIG. 8. The distance between the front and rear ends 212*a*, 212*b* of the first member 212 defines a length of the first member 212 and the distance between the left and right sides 230, 232 of the first member 212 defines a width of the first member 212.

Figure 9:
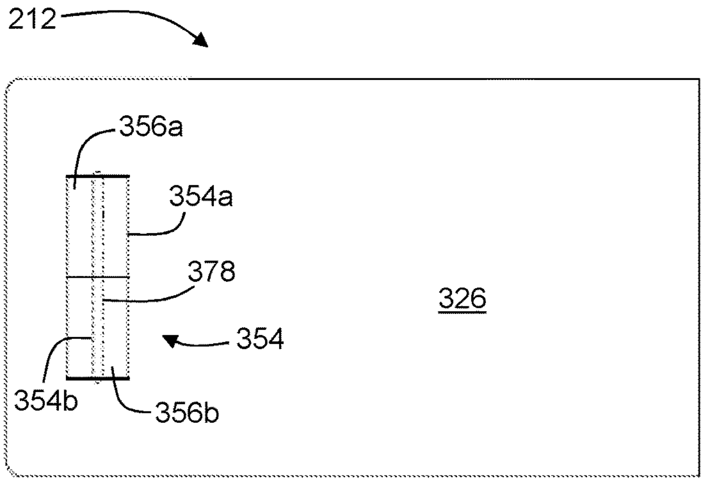
FIG. 9 is a plan view of the first member of FIG. 8.

Furthermore, as seen in FIG. 9 the attachment regions 354*a*, 354*b* of the first and second panels 326, 328 align to form the first attachment region 354 of the first member 212. The attachment regions 354*a*, 354*b* of the first and second panels 326, 328 extend across substantially the same width of the first member 212, this being approximately half the width of the first member 212, and are provided centrally, in the same position across the width of the first member 212. The slot 378 of the attachment region 354*b* of the second panel 328 is positioned centrally across the width of the first and second flaps 356*a*, 356*b*, and extends across approximately ⅙ of the width of the first and second flaps 356*a*, 356*b* in this embodiment. The slot of the second panel is adjacent the flaps of the first panel when the first member is formed.

Figure 10:
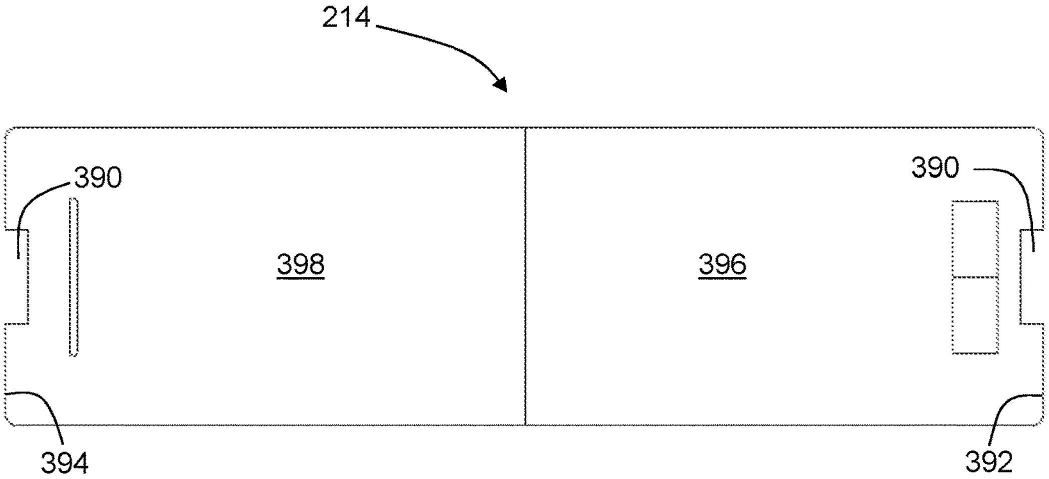
FIG. 10 is a plan view of the blank of FIG. 7.
Figure 11:
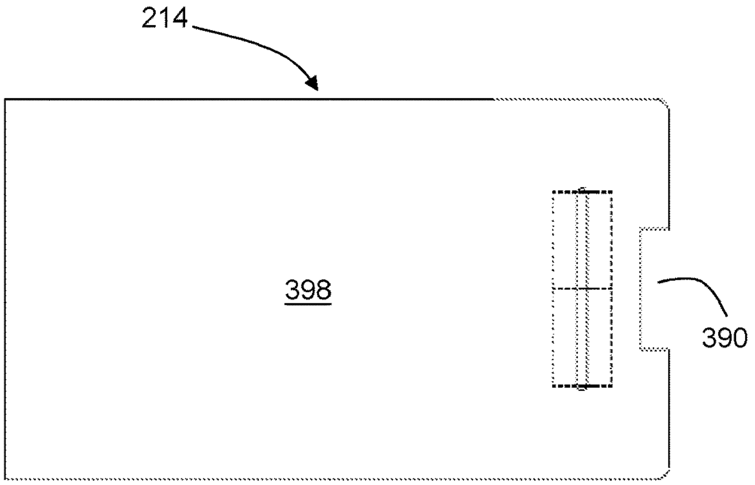
FIG. 11 is another plan view of the first member of FIG. 8.

Referring to FIGS. 10 and 11, the second member 214 of the arrangement of this embodiment is identical to the first member 212, apart from that the second member 214 includes a rectangular cut-out 390 at the rear edges 392, 394 of the first and second panels 396, 398, that together define a rectangular cut-out 390 of the second member 214 when the second member 214 is formed. When the arrangement is incorporated in the sleeve 218, the rectangular cut-out 390 of the second member 214 aligns with the rectangular and curved indentations or cut-outs 320, 322 of the sleeve 218 when the package is in the closed position.

Figure 12:
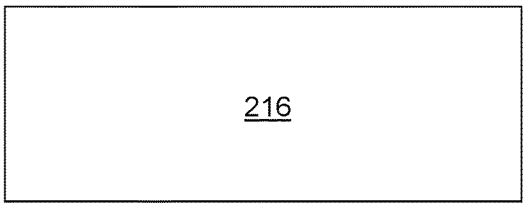
FIG. 12 is a plan view of a band forming part of the package of FIG. 1.

Referring to FIG. 12, the band 216 of this embodiment is identical to the band 16 of the embodiment of FIGS. 1 to 3, and will not be described again in detail here for conciseness.

To assemble the arrangement of this embodiment the band 216 is attached to the first and second members 212, 214 at their respective attachment regions 354.

Figure 13:
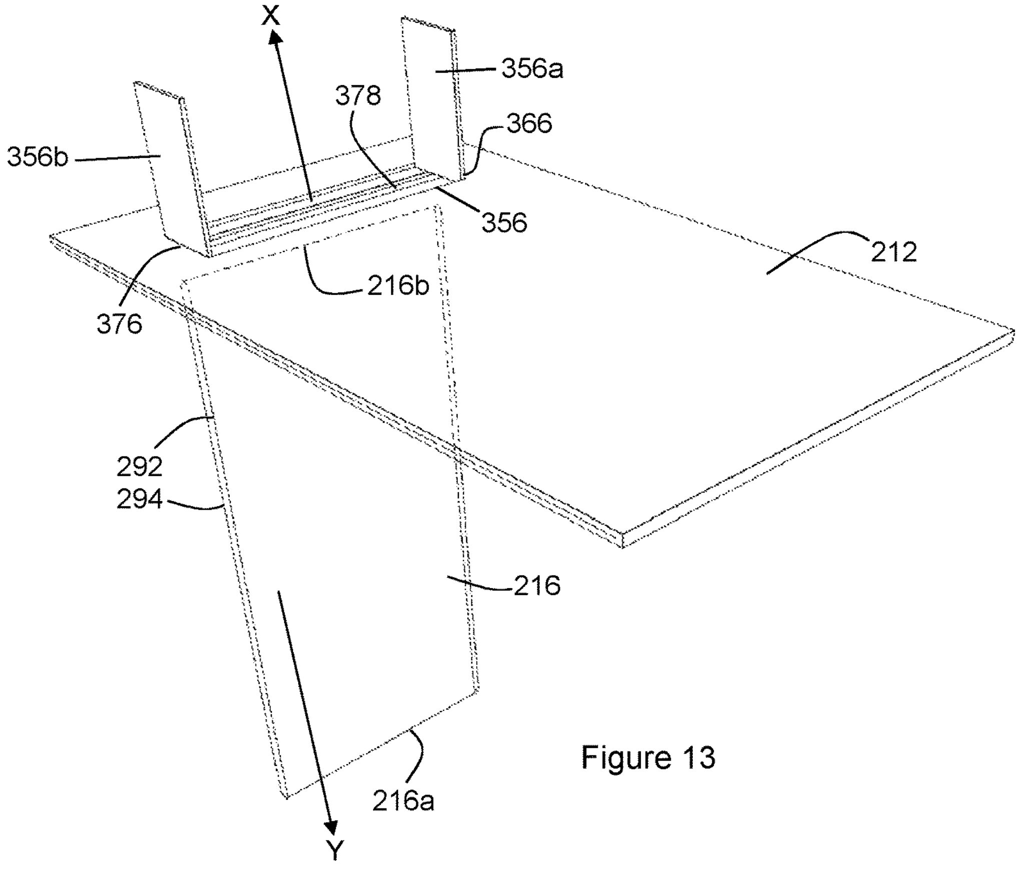
FIG. 13 is a perspective view of the first member of FIG. 7 with the band.

To attach the band 216 to the first member 212, the first and second flaps 356*a*, 356*b* of the first member are folded outwards, along their joining edges 366, 376, into the unfolded position illustrated in FIG. 13. The rear end of the band 216*b* is slotted through the band-receiving slot 378 and the band-receiving aperture 356 in succession, and is pulled in a first band direction, X, so that a first minor portion of the band 216 extends from the band-receiving aperture 356. In this example, the first band direction X is substantially perpendicular to the plane of the first member 212, but it should be understood that this is not required. The upper and lower halves 292, 294 of the band 216 that define the first minor portion are arranged to create a first minor volume, defined between interior surfaces of the first minor portion of the band 216, in which the flaps 356*a*, 356*b* can be received. The flaps 356*a*, 356*b* are then folded inwards along their joining edges 366, 376, into the unfolded or flush position, such that inner surfaces of the flaps 356*a*, 356*b* engage with the interior surface of the band 216. With the flaps 356*a*, 356*b* in the unfolded position, the front end 216*a* of the band 216 is pulled in a second band direction Y, generally opposite to the first band direction X, until the interior surface of the band 216 engages with the outer surfaces of the flaps 356*a*, 356*b*. The band is now attached to the first member 212, and the flaps 356*a*, 356*b* are essentially surrounded by the band 216 to form a mechanical connection between the band 216 and the first member 212.

The method for attaching the band 216 to the second member 214 is essentially the same as the method for the first member 212. The first and second flaps 356*a*, 356*b* of the second member 214 are folded outwards, along their joining edges 366, 376, into the unfolded position. The front end 216*a* of the band 216 is slotted through the band-receiving slot 378 and the band-receiving aperture 356 in succession, and is pulled in the second band direction, Y, so that a second minor portion of the band 216 extends from the band-receiving aperture 356. The upper and lower halves 292, 294 of the band 216 that define the minor portion are arranged to create a second minor volume, defined between interior surfaces of the first minor portion of the band 216, in which the flaps 356*a*, 356*b* can be received. The flaps 356*a*, 356*b* are then folded inwards along their joining edges 366, 376, into the unfolded or flush position, such that inner surfaces of the flaps 356*a*, 356*b* engage with the interior surface of the band 216. With the flaps 356*a*, 356*b* in the unfolded position, the band 216 is pulled in the first band direction X until the interior surface of the band 216 engages with the outer surfaces of the flaps 356*a*, 356*b*. The band 216 is now attached to the second member 214, and the flaps 356*a*, 356*b* are essentially surrounded by the band 216 to form a mechanical connection between the band and the second member 214.

When the first and second members 212, 214 are attached to the band 216 as described, the arrangement is ready to be incorporated into a sleeve 218 to form a package, as shown in FIG. 4.

Figure 14:
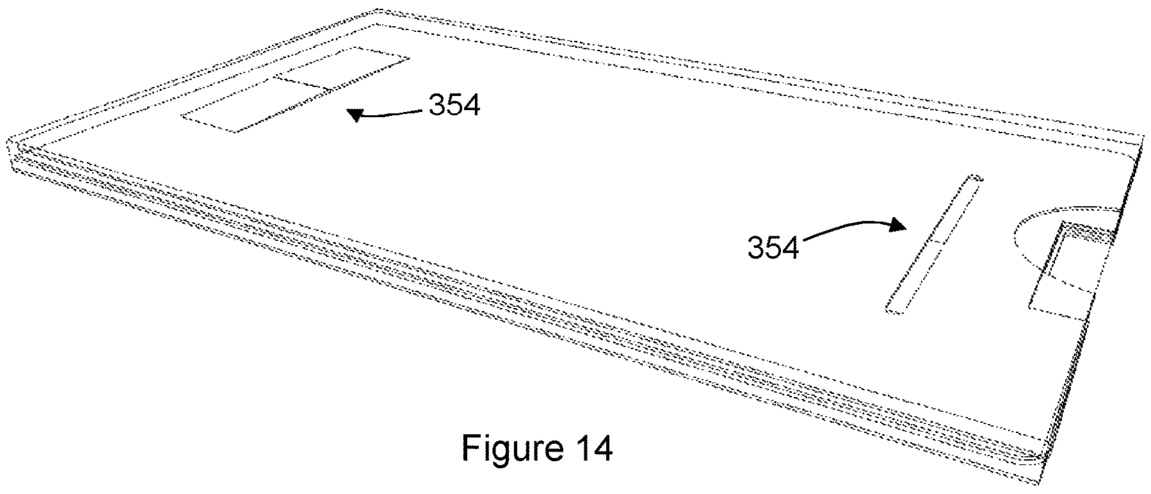
FIG. 14 is a perspective view of an assembled package incorporating the first member of FIG. 8.
Figure 15:
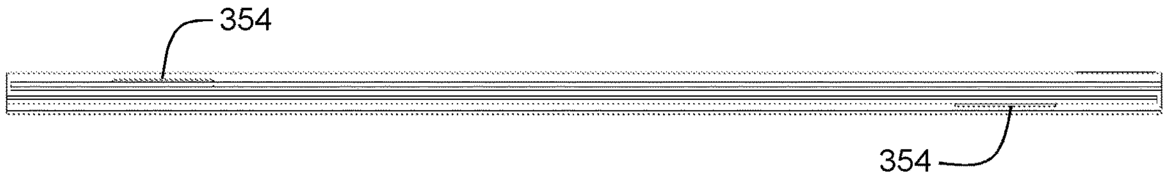
FIG. 15 is a side view of the package of FIG. 8.
Figure 16:
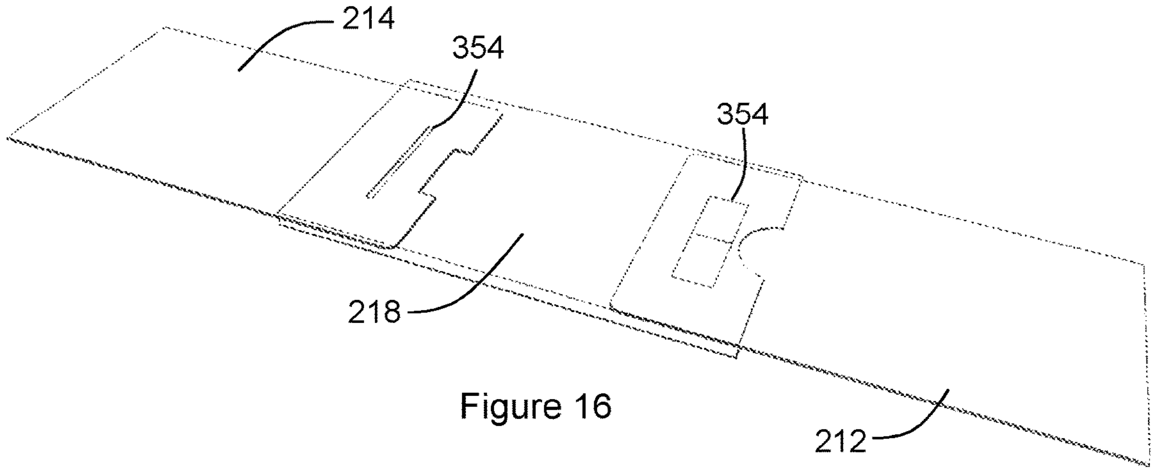
FIG. 16 is a perspective view of the assembled package of FIG. 14 in an open configuration.

Referring first to FIG. 4, this shows the arrangement of this embodiment incorporated into a sleeve 218 to provide a package of the invention. FIGS. 14 to 16 illustrate further views of the arrangement incorporated in the sleeve 218 of FIG. 5 to form a package.

FIGS. 14 and 15 show the arrangement fully housed within the sleeve 218 in a fully retracted position that corresponds to a fully closed position of the package. FIGS. 14 and 15 illustrate the positions of the first and second attachment regions 354 when the package is in the closed position. FIG. 16 shows a perspective view of the package when the arrangement is in a fully extended position that corresponds to a fully open position of the package.

The arrangement of this embodiment is disassembled in essentially the same manner as in the previous embodiments, in that the first and second members, in particular primary regions of the first and second members, are gripped by a user and pulled away from one another to disengage the mechanical engagement between the band and the flaps of the first and second members. In this way, the attachment regions of this embodiment are configured to be detachable from the band, rather than from the primary regions of the first and second members. Thus, this embodiment advantageously provides complete separation of the plastics material of the band and the cardboard material of the first and second members.

An arrangement in accordance with a further embodiment of the invention will now be described with reference to FIGS. 17 to 19. As in the previously described embodiments, the arrangement of this embodiment includes substantially planar, generally rectangular, first and second members 412, 414 that are coupled to each other by a band 416.

The first member 412 has a front end 412*a* and a rear end 412*b*, and comprising a front edge 426, a rear edge 428, a left edge 430, a right edge 432, an upper surface 436 and a lower surface 434. Correspondingly, the second member 414 has a front end 414*a* and a rear end 414*b*, and comprising a front edge 456, a rear edge 458, a left edge 462, a right edge 460, an upper surface 464 and a lower surface 466. The second member 414 further comprises a rectangular cut-out region 468 provided at its front edge 456, and located centrally along a width of the second member 414 defined between its left and right edges 462, 460.

The first member 412 comprises a first aperture or opening defined in a primary region of the first member. The first aperture is provided towards a rear end 412*b* of the first member 412, a small distance back from a rear edge 428 of the first member 414. In this embodiment, the first opening 500 is generally circular and defines a through-hole in the first member 412. That is, the first opening 500 extends through the full thickness of the first member 412 defined between upper and lower surfaces 436, 434 of the first member 412. In this embodiment the first opening 500 is formed as a die-cut hole. In other embodiments, the first opening 500 may be formed by another method, and the first opening 500 may extend only partially through the thickness of the first member 412.

The attachment region 482 of the second member 414 comprises a second aperture or opening defined in a primary region of the second member. The second aperture is provided towards a front end 414*a* of the second member, a small distance back from a front edge 456 of the second member 414, and comprises a second aperture or opening 502 that is essentially identical to the first opening 500 of the first member 412, although this is not a requirement. That is, the attachment region 482 of the second member 414 comprises a generally circular opening 502 in the form of a through-hole, formed by die-cutting. In other embodiments it would be possible for the second opening 502 to differ from the first opening 500 in shape, form, and/or method of manufacture.

As in previous embodiments, the first and second members 412, 414 each include attachment regions 450, 482 at which the first and second members 412, 414 are attached to the band 416 when the arrangement is assembled.

In this embodiment, the first and second attachment regions are provided in the form of first and second adhesive studs. The first and second adhesive studs are identical, and each comprise a generally cylindrical body having first and second, substantially flat, faces joined by a curved outer surface. The body of each of the adhesive studs is dimensioned so as to be received in the first and second openings in a close-fit.

Figure 18:
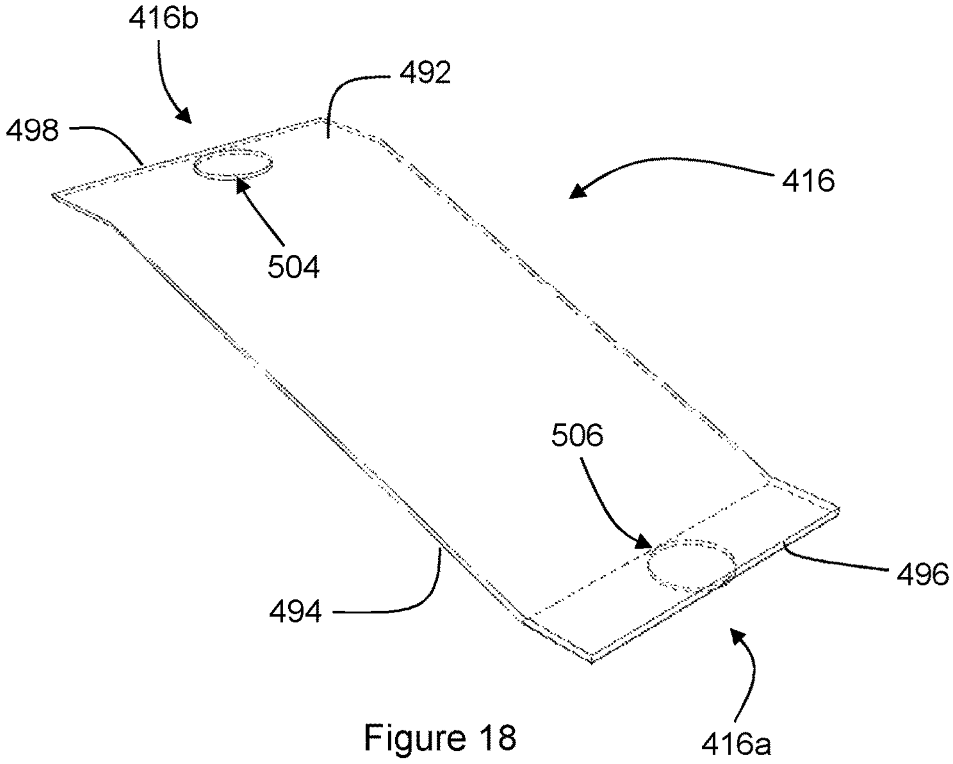
FIG. 18 is a perspective view of a band for use with the first and second members of FIG. 17.

Turning now to FIG. 18, the general form and material of the band 416 is the same as in previous embodiments. When incorporated in the arrangement of this embodiment, the band 416 is arranged such that it generally defines a rectangle in plan view and comprises upper and lower halves 492, 494 joined by front and rear edges 496, 498 provided at front and rear ends 416*a*, 416*b* of the band 416.

To assemble the arrangement of this embodiment, the first and second adhesive studs 504, 506 are attached to the band 416 by means of an adhesive. In particular, the first adhesive stud 504 is bonded or attached to the exterior surface of the upper half 492 of the band 416 via the first face 504*a* of the stud, at a position towards the rear end 416*b* of the band 416 and centrally across a width of the band 416 defined between left and right side edges of the band 416. The second adhesive stud 506 is bonded or attached to the exterior surface of the lower half 494 of the band 416 via the first face 506*a* of the stud 506, at a position towards the front end 416*a* of the band 416 and centrally across the width of the band 416.

To attach the first member 412 to the band 416, the first opening 500 of the first member 412 is aligned with the first adhesive stud 504, such that the front and rear ends 416*a*, 416*b*, 412*a*, 412*b* of the band 416 and the first member 412 are generally aligned, and the lower surface 434 of the first member 412 and the exterior surface of the upper half 492 of the band are facing one another. The first adhesive stud 504 is then inserted into the first opening 500, in which it is received in a close-fit. In other words, the first adhesive stud 504 is push-fit into the first opening 500. In this way, the first member 412 and the band 416 are coupled to one another. Specifically, the attachment region of the first member in the form of the first adhesive stud detachably couples the primary region of the first member to the band.

A similar procedure is followed to attach the second member 414 to the band 416. The second opening 502 of the second member 414 is aligned with the second adhesive stud 506, such that the front and rear ends 416*a*, 416*b*, 414*a*, 414*b* of the band 416 and the second member 414 are aligned, and the upper surface 464 of the second member 414 and the exterior surface of the lower half 494 of the band 416 are facing one another. The second adhesive stud 506 is then inserted, or push-fit, into the second opening 502, such that the second member 414 and the band 416 are coupled to one another. That is, the attachment region of the second member in the form of the second adhesive stud detachably couples the primary region of the second member to the band.

Figure 17:
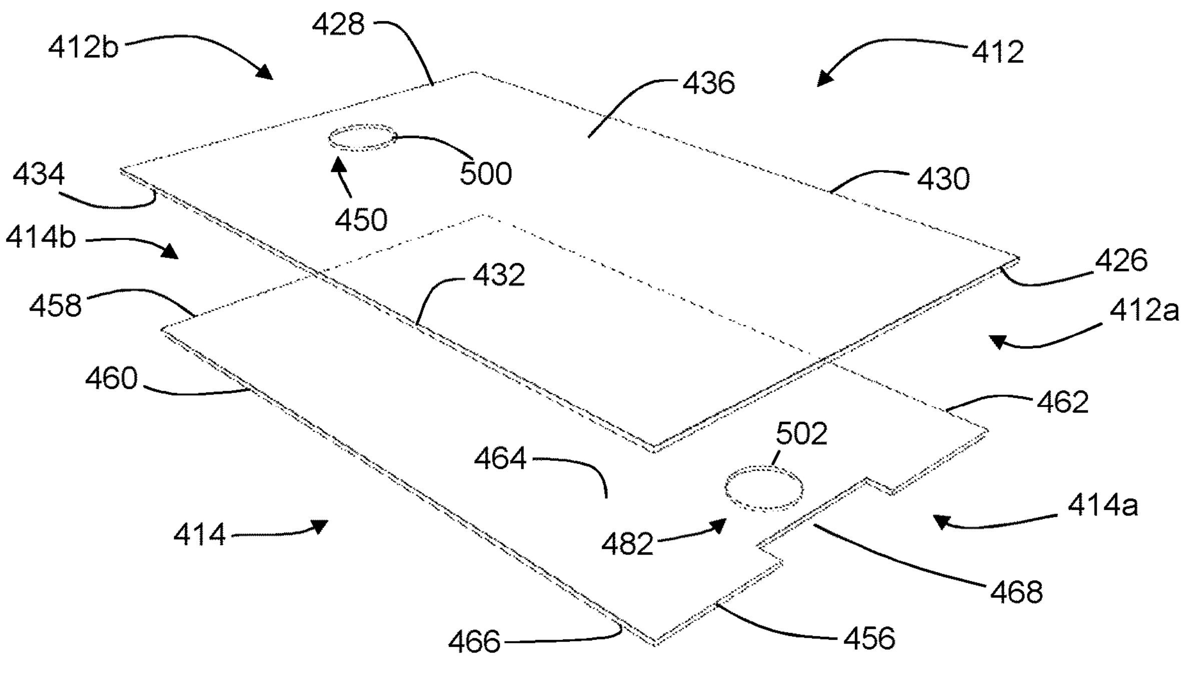
FIG. 17 is a perspective view of first and second members according to another embodiment.
Figure 19:
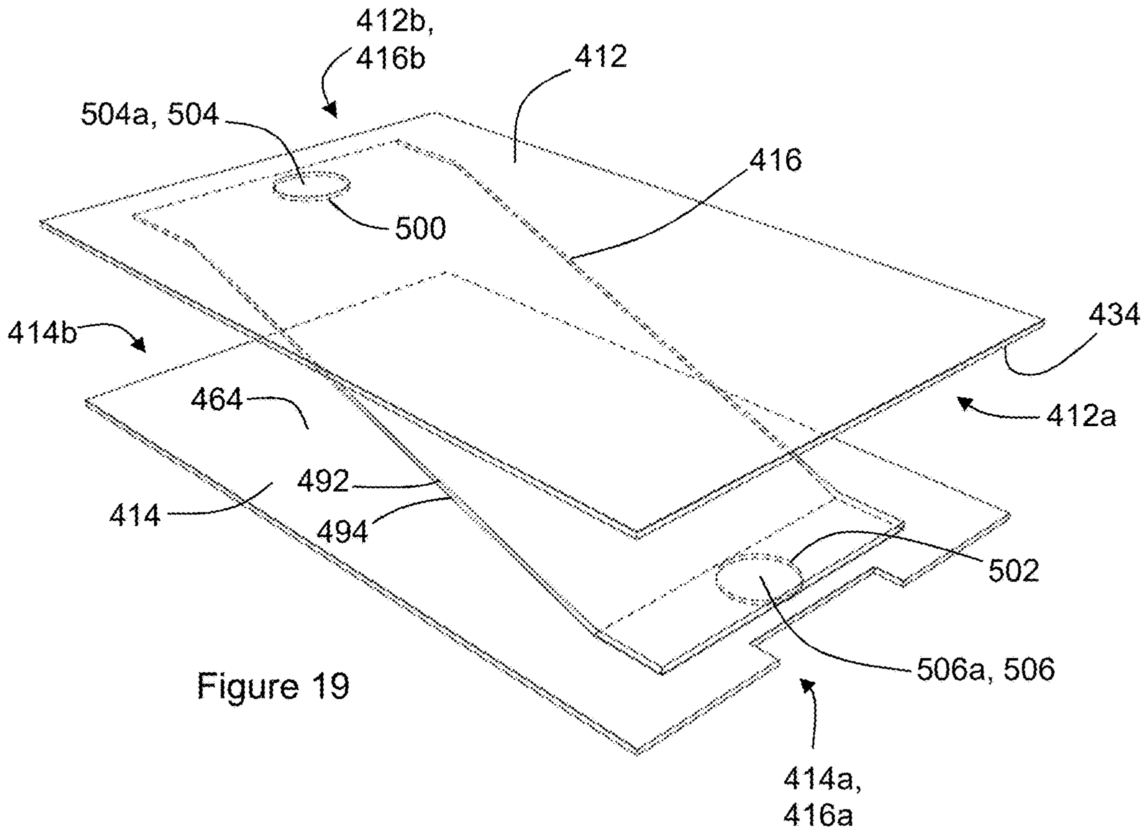
FIG. 19 is a perspective view of the first and second members of FIG. 17 attached to the band of FIG. 18.
Figure 20:
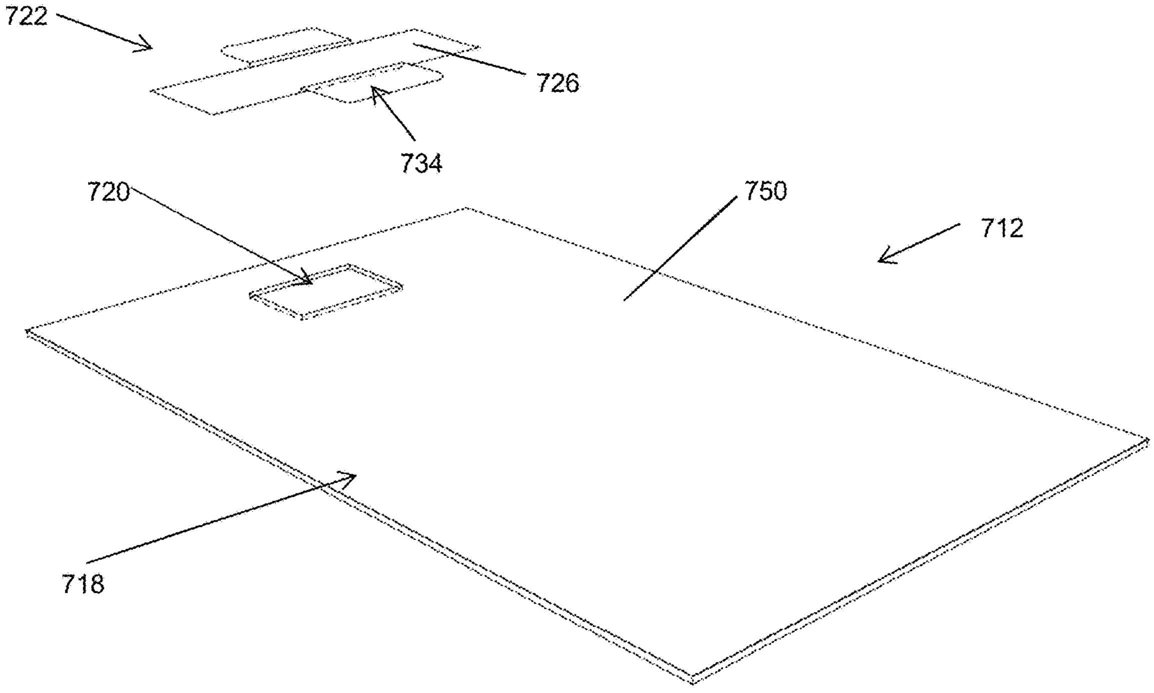
FIGS. 20 to 24 illustrate a further embodiment of a package insert.
Figure 21:
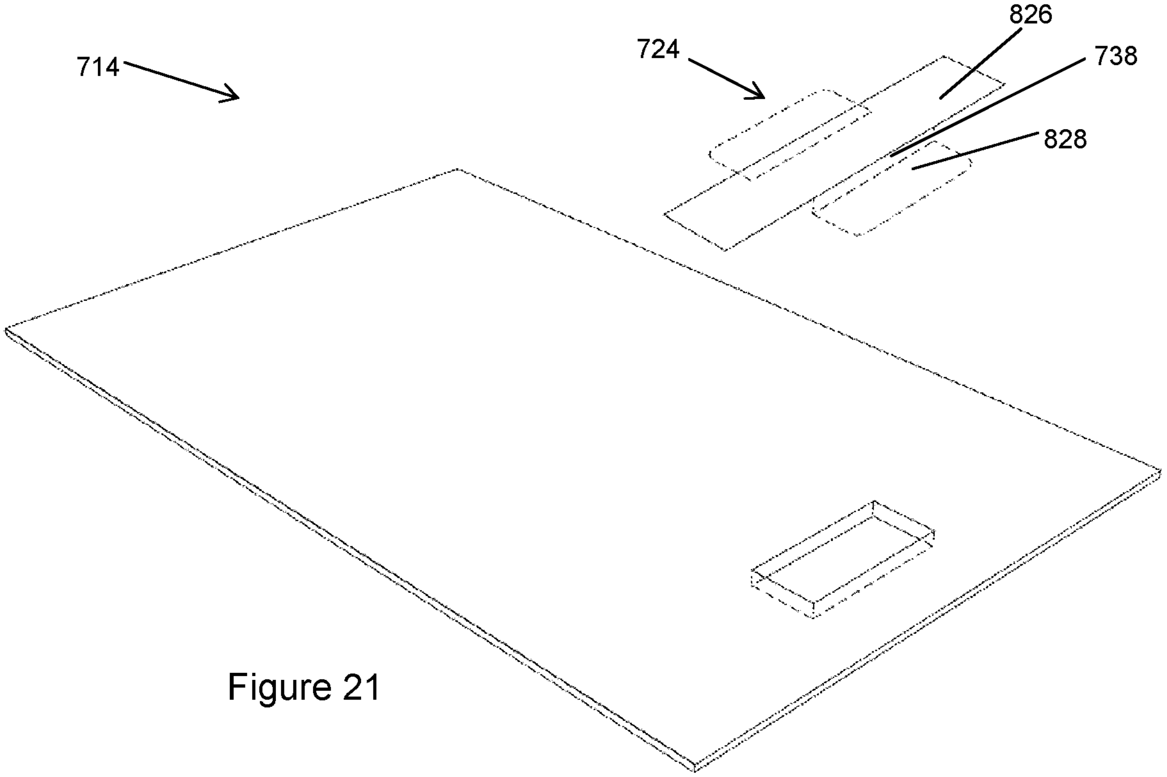

In other embodiments, the shape, dimensions and method of making the openings 500, 502 of the first and second members 412, 414 may differ from the embodiment of FIGS. 17 to 19, and/or may differ from each other. For example, although the openings 500, 502 of the first and second members 412, 414 are through-holes in this embodiment, the first and second openings 500, 502 may extend only partially through the thickness of the or each member 412, 414 in other embodiments.

Furthermore, the shape and dimensions of the adhesive studs 504, 506 may differ from that described. In one embodiment, the studs 504, 506 may each comprise a circumferential flange extending about their first faces 504*a*, 506*a*. In this way, the studs 504, 506 may attach the band 416 to the members 412, 414 in a purely mechanical manner, without the need for an adhesive such as glue. In this case, the band 416 may comprise apertures through which the adhesive studs 504, 506 are received before being inserted in a push-fit into the openings 500, 502 of the first and second members 412, 414, such that the circumferential flanges of the studs 504, 506 form limiting and holding means. That is, the flanges may act to prevent the studs 504, 506 from being pushed too far through the openings of the members 412, 414, especially in the case where the openings 500, 502 of the members 412, 414 are through-holes. Furthermore, when the arrangement is assembled, the circumferential flanges engage with the interior surface of the band 416, such that the band 416 is sandwiched and held between the circumferential flange of the adhesive studs 504, 506 and the lower and upper surfaces 434, 464 of the first and second members 412, 414.

To disassemble the arrangement of this embodiment, a user grips the primary regions of the first and second member, and tugs or pulls the first and second members away from one another. The first and second adhesive studs are pulled out of the first and second apertures of the first and second members. Thus, when the arrangement of this embodiment is disassembled, the first and second adhesive studs of the first member remain attached to the band, and the primary regions of the first and second members are separated from the attachment regions, i.e. the adhesive studs, of the first and second members. In this embodiment, the attachment regions, i.e. the first and second adhesive studs, are configured to be detachable from the primary regions of the first and second members.

FIGS. 20 to 24 illustrate an arrangement in accordance with another embodiment of the invention. As in the previous embodiments, the arrangement comprises a first member 712, a second member 714 and a band 716, and may be housed in a sleeve such as that of FIGS. 5 and 6 when assembled in a package.

The first member has a front end, a rear end, a left side, a right side, a first or inner surface and a second or outer surface. Correspondingly, the second member has a front end, a rear end, a left side, a right side, a first or inner surface and a second or outer surface.

The first member comprises a primary region 718 and a rectangular aperture 720 or through-hole defined in the primary region. The rectangular aperture 720 is located towards the rear end of the first member, and centrally across the width of the first member defined between the left and right side edges of the first member. Correspondingly, the second member comprises a primary region and a rectangular aperture or through-hole located towards the front end of the second member, and centrally across the width of the second member defined between the left and right side edges of the second member.

The band of this embodiment is identical to the bands of the previous embodiments and will not be described again in detail here for conciseness.

The first and second members further each comprise an attachment region that detachably couples the primary region of the first and second members to the band.

The attachment regions comprise first and second coupling means 722, 724, respectively, for detachably coupling the band to the members. The first and second coupling means 722, 724 are identical to each other in this embodiment. Thus, only the first coupling means will be described for conciseness.

The first coupling means 722 comprises a first adhesive strip 726 and a first coupling member 728. The first adhesive strip is rectangular in shape, and is dimensioned so as to extend across substantially the full width of the band when attached to the band in the assembled state of the arrangement, as best appreciated with reference to FIG. 22.

The first coupling member 728 is formed of a folded, generally flat, blank that comprises five rectangular sections or panels. Specifically, the blank of the first coupling member includes three major panels and two minor panels. The three major panels define a central panel 731 of the blank and first and second outer panels 732, 734 respectively of the blank. The minor panels comprise a first minor panel 736 that is positioned between the first outer panel 732 and the central panel 731, and a second minor panel 738 that is positioned between the second outer panel 734 and the central panel 731. The panels of the blank are integral and demarcated from each other by folds or scores 740. Specifically, a first fold adjoins the first outer panel 732 and the first minor panel 736, a second fold adjoins the first minor panel 736 and the central panel 731, a third fold adjoins the central panel 731 and the second minor panel 738, a fourth fold adjoins the second minor panel 738 and the second outer panel 734.

Figure 22:
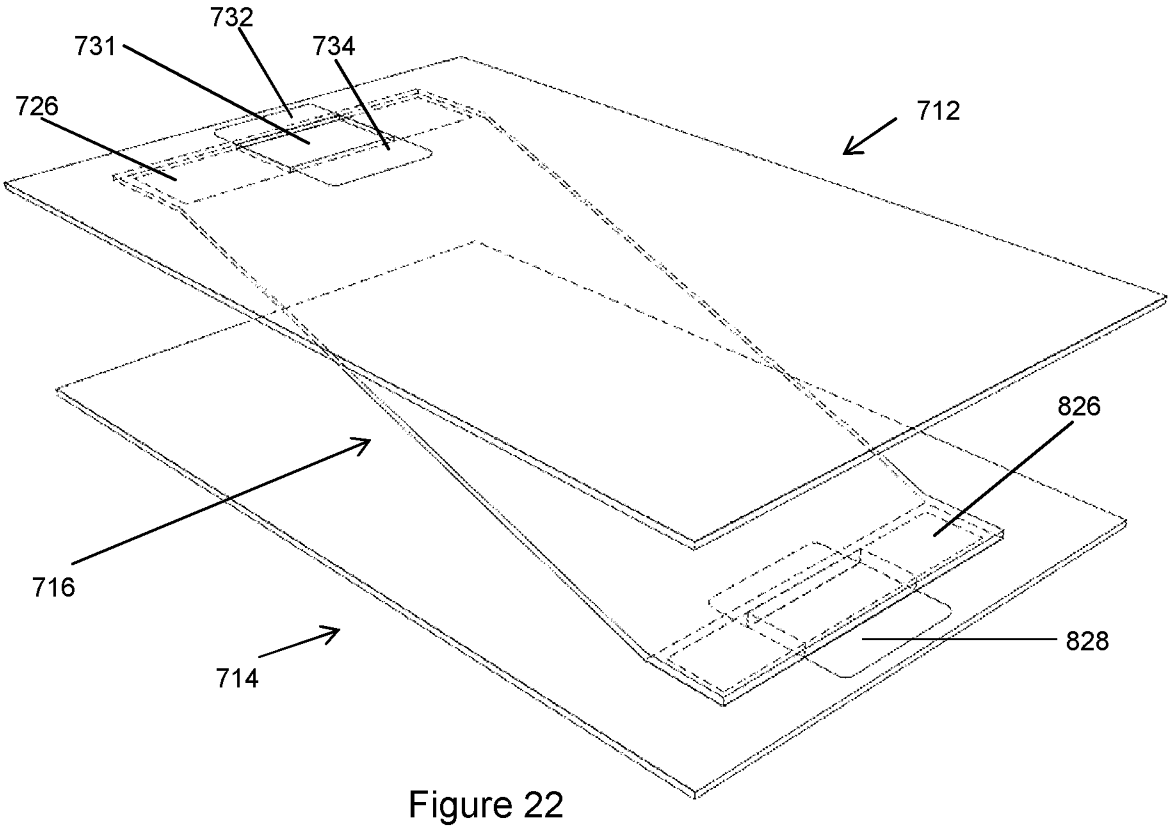
Figure 23:
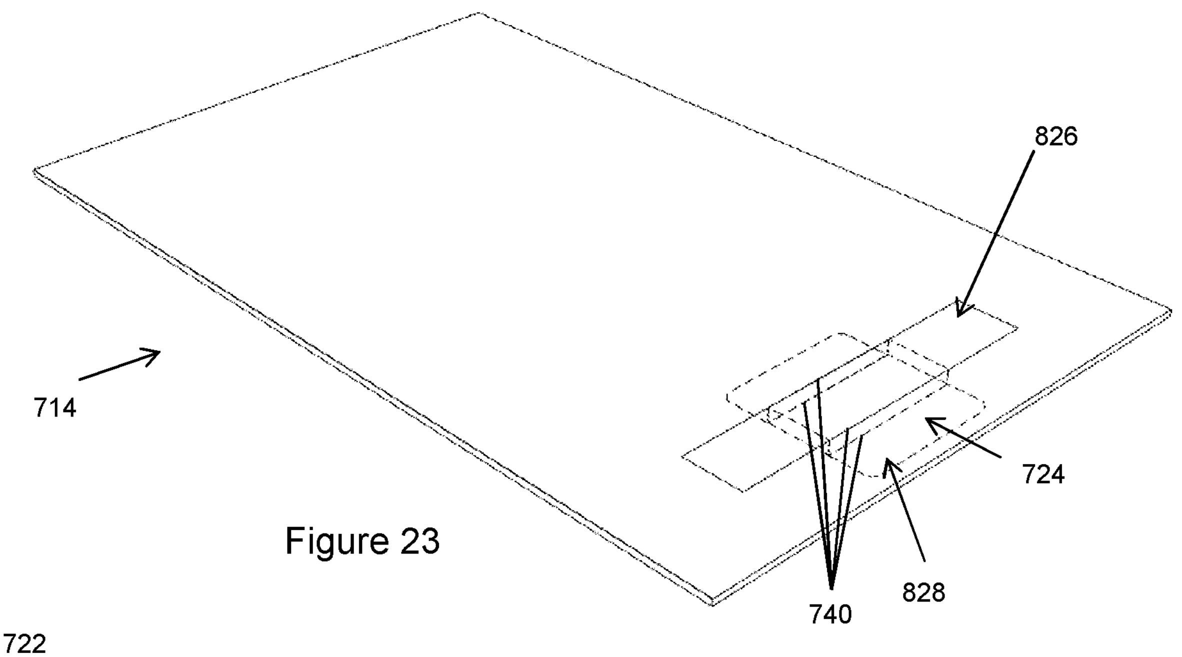
Figure 24:
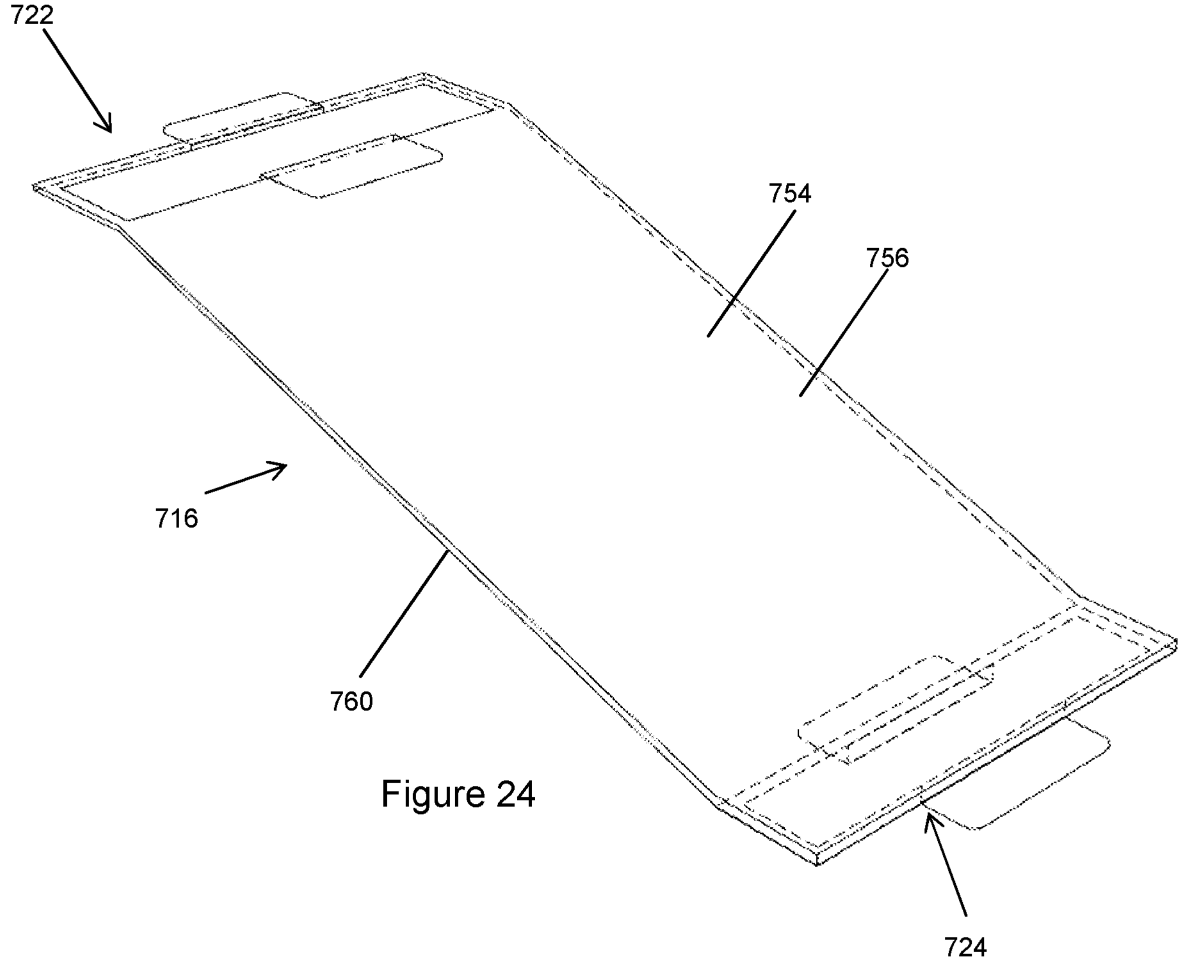

When the blank is folded at the scores to form the first coupling member 728, the minor portions are substantially perpendicular to the major portions, and the first coupling member 728 defines a top-hat profile, which is best illustrated in FIG. 22 which shows the first coupling member 728 integrated into the arrangement. As will be explained, an outer surface of the central panel 731 defines a band-engagement surface and an inner surface of the central panel 731 defines an adhesive-strip engagement surface. The outer panels 732, 734 define member-engaging surfaces that engage with the first and second member 712, 714 in the assembled arrangement for mechanical coupling of the members to the band 716. The minor panels 736, 738 have a width that is substantially equal to, or slightly greater than, a thickness of the first member 712 defined between its upper and lower surfaces 750, 752. The central panel has a width that is substantially equal to, or slightly less than, a width of the aperture of the first member.

As noted, the second coupling means 724 is identical to the first coupling means 722, comprising a second adhesive strip 826 and a second coupling member 828 identical to the first adhesive strip 726 and the first coupling member 728 of the first coupling means 722, and will therefore not be described here in detail. Like parts of the first and second coupling means are provided with like reference numerals.

To assemble the arrangement of this embodiment, the first and second coupling means 722, 724 are attached to the band 716, and the first and second members 712, 714 are then attached to the band 716 at, and by means of, the first and second coupling means 722, 724.

In the assembled arrangement, the first coupling means 722 is attached to the exterior surface 754 of the upper half 756 of the band 716, at the rear end of the band, and the second coupling means is attached to the exterior surface of the lower half 760 of the band 716, at the front end of the band 716.

The first coupling means 722 is attached to the band 716 as follows. The first coupling member 728 is positioned towards the rear end, and centrally across the width, of the band 716. The outer surface of the central panel 731 is engaged with the exterior surface 754 of the upper half 756 of the band 716. The adhesive strip 726 is positioned across the width of the band 716, such that a central region of the adhesive strip 726 contacts and adheres to the inner surface of the central panel 731. Outer regions of the adhesive strip 726 at either side of the central region contact and adhere to the exterior surface 754 of the upper half 756 of the band 716. In this way, the adhesive strip 726 bonds the first coupling member 728 to the band. When the first coupling member 728 is attached to the band in this way, the outer panels or flaps of the first coupling member 728 are spaced from the band 716 by a gap by virtue of the minor panels of the first coupling member. The size of the gap, corresponding to a width of the minor panels, is dimensioned to be substantially equal to a thickness of the first member 712 defined between its upper and lower surfaces.

The method of attaching the second coupling means to the second member is substantially the same as the method for attaching the first coupling means to the first member. The second coupling member is positioned towards the front end, and centrally across the width, of the band. The outer surface of the central panel is engaged with the exterior surface of the lower half of the band. The adhesive strip is positioned across the width of the band, such that a central region of the adhesive strip contacts and adheres to the inner surface of the central panel, and outer regions of the adhesive strip at either side of the central region contact and adhere to the exterior surface of the lower half of the band. In this way, the adhesive strip bonds the second coupling member to the band. When the second coupling member is attached to the band in this way, the outer panels of the second coupling member are spaced from the band by a gap by virtue of the minor panels of the second coupling member. The size of the gap, corresponding to a width of the minor panels, is dimensioned to be substantially equal to a thickness of the second member defined between its upper and lower surfaces.

Once the first and second coupling means are attached to the band, the first and second members are coupled or attached to the band via the first and second coupling means.

To couple the first member to the band, the outer panels of the first coupling member are folded inwardly towards one another, and are inserted through the aperture in the first member. Specifically, the first and second outer panels are pivoted about the first and fourth folds until the first and second outer panels extend substantially perpendicularly with respect to the plane of the central panel. Because the width of the central panel of the first coupling member is substantially equal to the width of the aperture of the first member, this allows the first and second outer panels to be inserted through the first aperture simultaneously.

Once the first and second outer panels are received in the first aperture, the lower surface of the first member is brought into contact with the exterior surface of the band, and the first and second outer panels are folded outwards, away from one another, until the member-engaging surfaces of the outer panels engage the upper surface of the first member. In this way, the first member is coupled to the band via the first coupling means.

The second member is coupled to the second coupling means of the band in essentially the same manner as the first member is coupled to the first coupling means, and will therefore not be described here in detail for conciseness.

As in previous embodiments, the arrangement of this embodiment is advantageous, as it is easy to disassemble into its constituent parts, and thus provides a benefit in terms of ease of disposal for recycling. Separating the band from the first and second members, i.e. disassembling the arrangement, may be achieved in essentially the same manner as for previous arrangements. That is, a user may grip the first and second members at their front and rear ends respectively, and pull or tug the first and second members in opposite directions to release the mechanical engagement between the first coupling member and the first member and the second coupling member and the second member. In this way, the first and second outer panels are pulled out of the apertures of the first and second members. The first and second attachment regions of the first and second members remain attached to the band, and the primary regions of the first and second members are separated for easy recyclability.

When disassembled in this way, the first and second coupling means remain attached to the band, but the first and second members are completely separated from the band and other parts of the arrangement for recycling.

In each of the embodiments described, the primary regions of the first and second members are formed of a non-plastics material, in these examples of cardboard, and the band is formed of a plastics material.

FIGS. 25 to 28 illustrate an alternative sleeve for use in a package.

Figure 25:
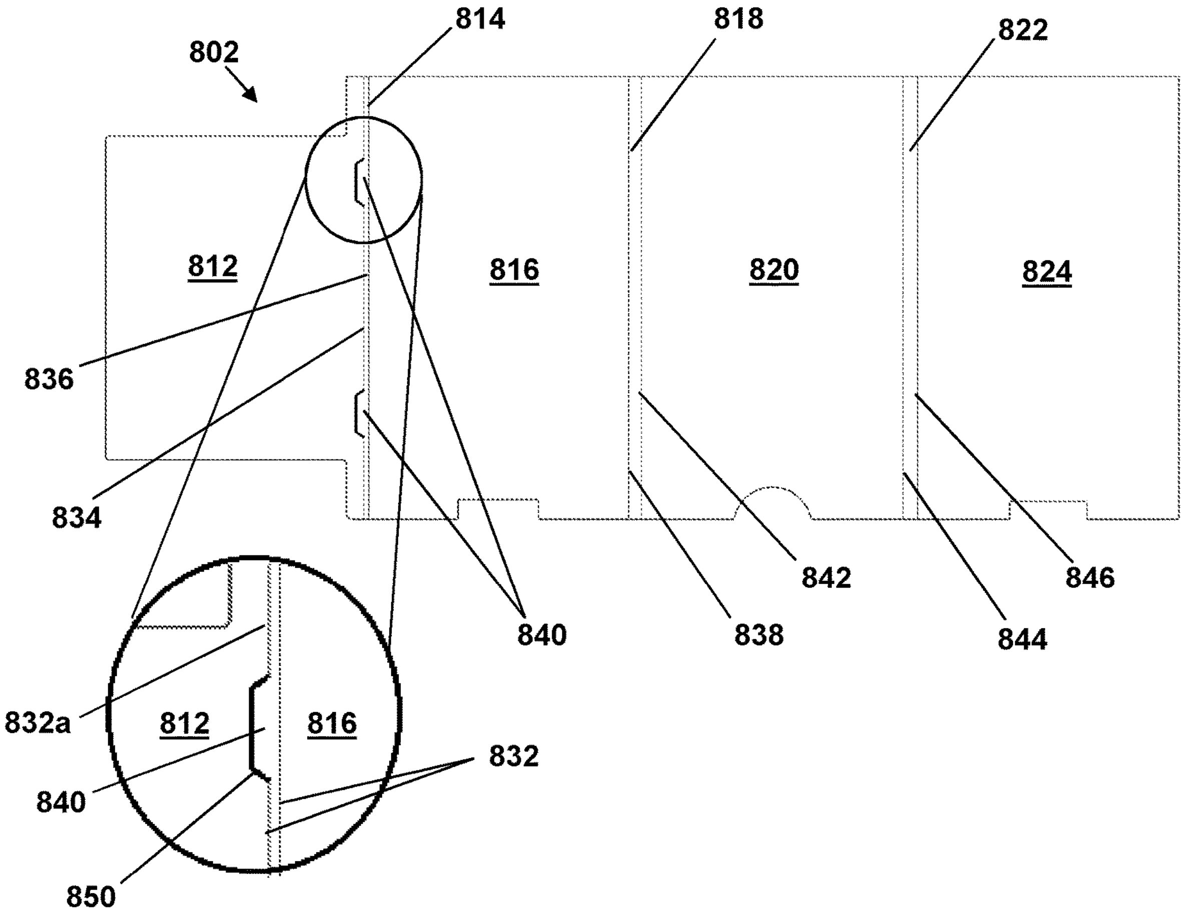
FIG. 25 is a plan view of an alternative sleeve blank for forming a sleeve for use in a package.

Referring in particular to FIG. 25, the sleeve comprises a flat blank 802, which is substantially the same as the flat blank of FIG. 4, manufactured in the same way by cutting and creasing or scoring a sheet of flexible cardboard, plastics, tear-resistant laminate, or other material. The sheet is flexible enough to allow for the bending that is necessary to form the sleeve 800, but is stiff enough to provide structural support.

As with the blank of FIG. 4, the blank 802 of FIG. 25 consists of seven integral, substantially oblong sections or panels 812, 814, 816, 818, 820, 822, 824. Four of the sections, namely a divider panel 812, a lower panel 816, an upper panel 820 and a secondary lower panel 824 are relatively wide, and three, namely a first side wall 814, a second side wall 818, and a third side wall 822, are relatively narrow. In the assembled sleeve, the divider panel 812 divides the space between the upper and lower panels 816, 820, to define upper and lower compartments in the sleeve.

The sections 812, 814, 816, 818, 820, 822, 824, each of the blank 802 are integral and demarcated from each other by folds or scores 832 (see inset of FIG. 25). In particular, the first side wall 814 joins a first edge 834 of the divider panel 812 to a first edge 836 of the lower panel 816, and meets those edges at boundaries defined by folds. The second side wall 818 joins a second edge 838 of the lower panel 816 to a second edge 842 of the upper panel 820 and meets those edges at boundaries defined by folds. The third side wall 822 joins a first edge 844 of the upper panel 820 to a second edge 846 of the secondary lower panel 824 and meets those edges at boundaries defined by folds.

The sleeve blank 802 of FIG. 25 differs from the sleeve blank of FIG. 4 primarily in that the sleeve blank 802 of FIG. 25 additionally comprises protrusions 840 that protrude from the first side wall 814 of the blank 802. In particular, the first side wall 814 defines a side wall plane and the protrusions 840 protrude away from the first sidewall 814 substantially in the first side wall plane.

Figure 26:
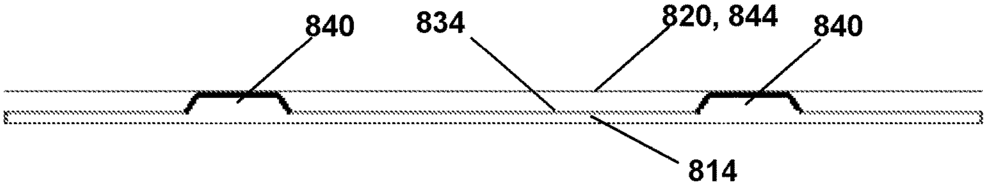
FIG. 26 is a cut-away side view of a sleeve formed by folding the blank of FIG. 25.

As can be best seen in FIG. 26, in the folded sleeve, the protrusions 814 protrude from the first side wall 812 beyond the first edge 834 of the divider panel 812 to support the upper panel 820 along its first edge 844. In this way, the protrusions 840 act to hold the upper panel 820 away from the divider panel 812 at its first edge 834, thereby preventing compression of the upper compartment of the sleeve.

Figure 27:
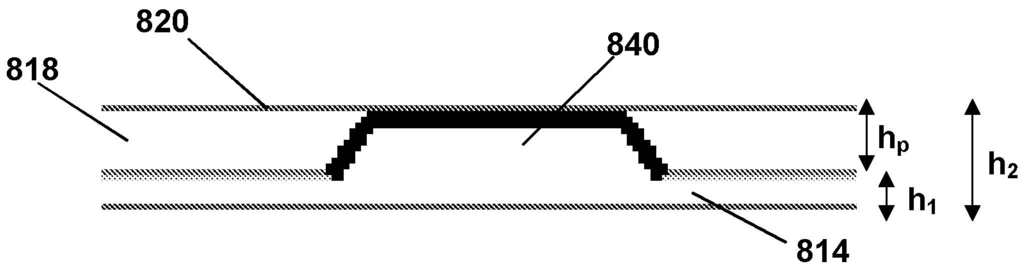
FIG. 27 is a partial enlarged view of FIG. 26 in the vicinity of a protrusion forming part of the sleeve.

Referring to FIG. 27, which shows an enlarged view of a protrusion 840 with the sleeve 800 in the folded configuration, the first side wall 812 has a first height $h_1$, while the second side wall 818 has a second height $h_2$ that is greater than the first height $h_1$. The protrusion 840 has a protrusion height $h_p$, selected such that $h_1+h_p=h_2$. In this way, when the upper panel 820 rests on the protrusions 840, the upper panel 820 is held at the same height above the lower panel (not visible) on each of the left and right sides: at one side by the second side wall 818 at height $h_2$, and on the other side by the combination of the first side wall 814 and the protrusion 840 at height $h_1+h_p=h_2$). Thus, the upper panel 820 is held parallel to the lower panel.

Referring back to FIG. 25, and in particular the inset of FIG. 25 showing a magnified portion in the vicinity of the protrusion 840, the protrusion 840 is formed by being 'reclaimed' from the divider panel 812.

In particular, the fold or boundary **832*a* between the divider panel 812 and the first side wall 816 is interrupted by the protrusion 840. In the area of this interruption, the divider panel 812 comprises a cut-out 850, and the protrusion 840 protrudes beyond the foldable boundary 832*a* into the cut-out 850. Said another way, the portion that is cut out of the divider 812 by the cut-out 850** forms the protrusion, so that the shape of the cut out defines the shape of the protrusion.

Figure 28:
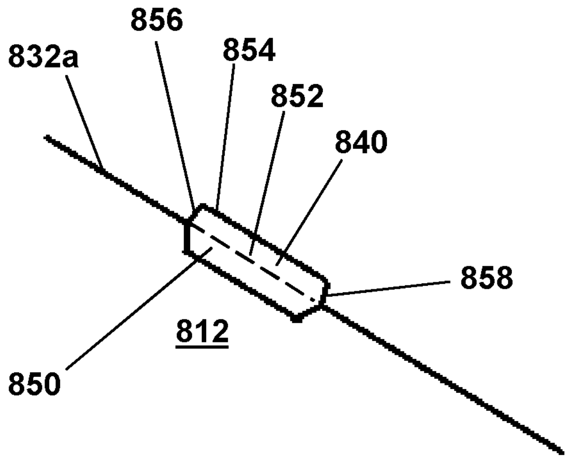
FIG. 28 is a perspective view of the folded sleeve of FIG. 26.
Figure 29:
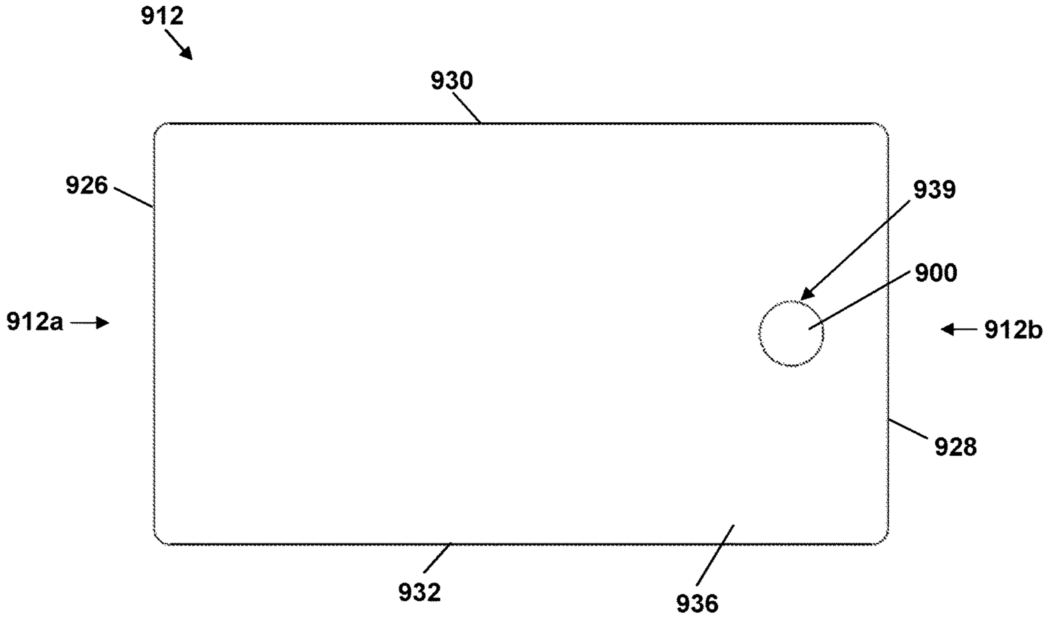
FIG. 29 is a plan view of a moveable member of a package insert according to an embodiment of the invention.

When the blank 802 is laid flat, as in FIG. 25, the cut-out 850 in the divider panel 812 accommodates the protrusion 840. However, when the blank 802 is folded to form the sleeve such that the first side wall 814 lies orthogonal to the divider panel 812, as shown in FIG. 28, the protrusion 840 remains in the plane of the first side wall 814, rather than the plane of the divider panel 812, such that the protrusion 840 stands proud of the first side wall 814 and extends upwardly to protrude above the divider 812. This also reveals the cut-out 850 in the divider panel 812.

Referring still to FIG. 28, the protrusion 840 comprises a first edge 852 joined to the first side wall 814 and a second edge 854 opposite the first edge 852. The second edge 854 is a free edge that, in the folded sleeve, supports the upper panel. The first and second edges 852, 854 of the protrusion 840 are joined by respective third and fourth edges 856, 858.

In this embodiment a length of the first edge 852 is greater than a length of the second edge 854.

The third and fourth edges 856, 858 are sloped between the first and second edges 852, 854, and in particular define an acute angle to the first edge 852 and an obtuse angle to the second edge 854. In this way, the protrusion 840 has a trapezoidal shape. The sloping of the third and fourth edges 856, 858, and the obtuse angle with the free edge 854 of the protrusion 840, facilitates separation of the protrusion 840 from the divider panel 812 when the blank is folded for assembly, and also makes the free corners of the protrusion (i.e. the corners between the second edge 854 and the third and fourth edges 856, 858) more resistant to wear.

FIGS. 29 to 33 illustrate an arrangement in accordance with another embodiment of the invention. As in the previous embodiments, the arrangement comprises substantially planar, generally rectangular, first and second members 912, 914, which are also referred to as moveable members. The first and second members 912, 914 are each couplable to a band 916, and in this way are couplable to each other by the band 916.

The first member 912 has a front end **912*a* and a rear end 912*b*, and comprises a front edge 926, a rear edge 928, a left edge 930, a right edge 932, an upper surface 936 and a lower surface 934. In use, the upper surface 936 as shown defines a running surface that lies parallel to the divider and faces the band. The first member 912 further comprises a first recess 900 that defines a first recess region or attachment region 939 of the first member 912. The remainder of the first member 912 not defined by the first attachment region 939 defines a primary region of the first member 912**.

The first attachment region 939 defines a portion of the first member 912 at which the band 916 is attached when the arrangement is assembled. As in the other described embodiments, the first attachment region 939 is configured to detachably couple the primary region of the first member 912 to the band 916.

The first recess 900 is provided towards the rear end 912*b* of the first member 912, a small distance back from the rear edge 928 of the first member 912, and centrally across the width of the first member 912 defined between its left and right edges 930, 932. The first recess 900 extends partially through the thickness of the first member 912 defined between the upper and lower surfaces 936, 934.

Figure 30:
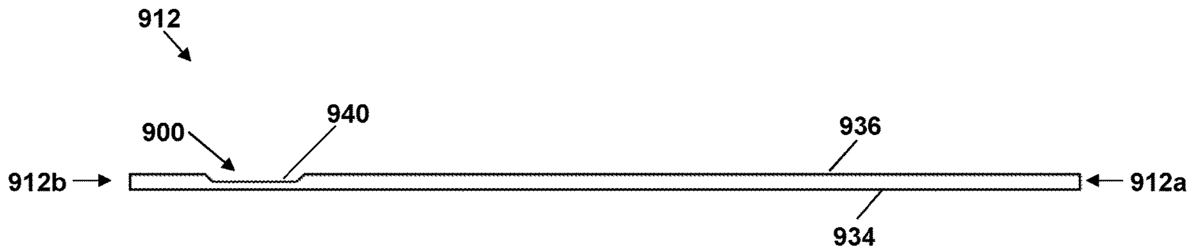
FIG. 30 is a cross-sectional side view of the moveable member of FIG. 29.

In this embodiment, the first recess 900 is generally circular, and is formed as a debossed hole or depression in the upper surface 936 of the first member 912. As illustrated in FIG. 30, the first recess 900 has a slight taper, and terminates at a base 940 of the first recess 900. A vertical spacing between the base 940 of the recess and the running surface 936 defines a depth of the recess.

The first recess 900 extends approximately halfway through the thickness defined between the upper and lower surfaces 936, 934 of the first member 912 in this embodiment. In other embodiments, the first recess 900 may extend through a greater or lesser extent of the thickness of the first member 912, and may take a different shape, so long as the first recess 900 is suitable for accommodating an adhesive material (not shown). As will be explained in more detail later, the adhesive material lies flush or sub-flush with the running surface 936 of the first member 912 when accommodated in the first recess 900, and couples the first member 912 to the band 916 when the arrangement is assembled. The adhesive material may be glue, for example, or may take the form of any other suitable adhesive substance.

Figure 31:
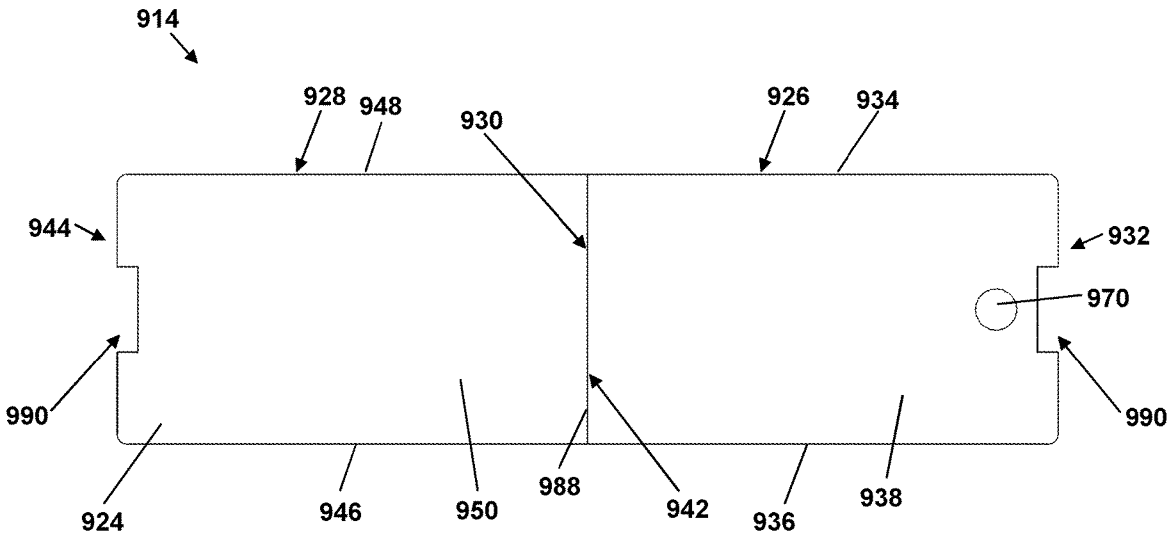
FIG. 31 is a plan view of a sleeve blank for forming an alternative moveable member.
Figure 32:
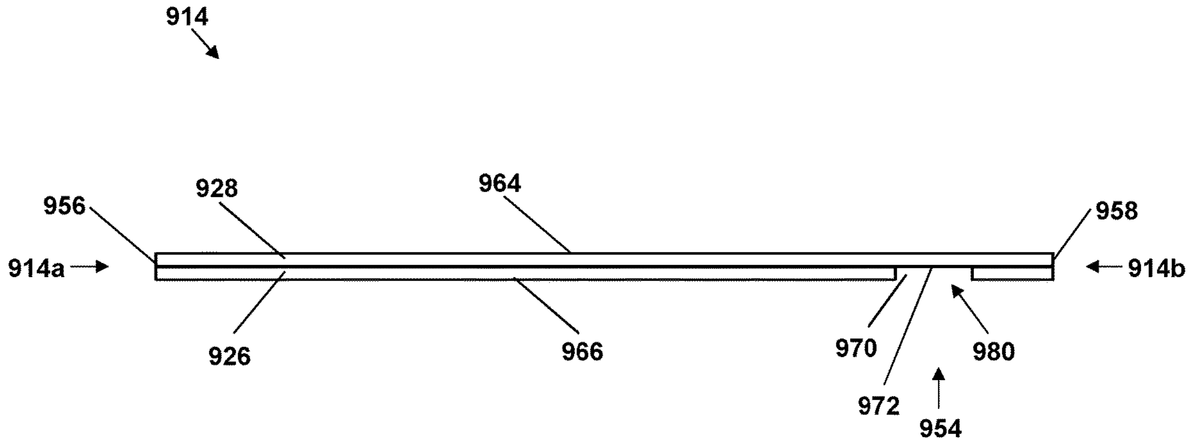
FIG. 32 is a cross-sectional side view of a moveable member formed by the sleeve blank of FIG. 31.

Referring to FIGS. 31 and 32, the second member 914 is of a different construction to the first member, but may perform essentially the same function. The second member comprises first and second panels or walls 926, 928, joined by a hinge 988.

FIG. 31 shows that second member 914 is formed by a blank 924. In its unfolded state, the first and second panels 926, 928 lie end-to-end, joined by the hinge 988.

The first panel 926 has a front end 930, a rear end 932, a left side 934, a right side 936, a first or inner surface (not shown in FIG. 31) and a second or outer surface 938. Correspondingly, the second panel 928 has a front end 942, a rear end 944, a left side 946, a right side 948, a first or inner surface (not shown in FIG. 31) and a second or outer surface 950.

The first and second panels each include a rectangular cut-out 990 at their rear edges, which together define a rectangular cut-out of the second member 914 when the second member 914 is formed, that is positioned at the rear edge 958 of the second member 914, and located centrally along a width of the second member 914 defined between its left and right edges 962, 960.

The first panel 926 further comprises a panel aperture or opening 970 that is located towards the rear end 932 of the first panel 926, and centrally across the width defined between the left and right side edges 934, 936 of the first panel 926. In this embodiment the panel opening 970 is formed as a die-cut hole, but in other embodiments the panel opening 970 may be formed by another method. Also, it would be possible for the panel opening 970 to extend only partially through the thickness of the first panel 926.

The hinge 988 is defined by a fold or score provided between the front ends 930, 942 of the panels. To form the second member 914, the blank 924 is folded at the blank fold 988, and the inner surfaces of the first and second panels 926, 928 are bonded to each other by means of adhesive provided on one or both of the inner surfaces. Thus, the first and second panels 926, 928 are arranged one on top of the other, in a face-to-face arrangement. When the second member 914 is formed, the first and second panels 926, 928 are coplanar to define a double wall, with the first panel 926 defining a first wall and the second panel 928 defining a second wall.

Referring to FIG. 32, when formed, the front and rear ends and the left and right sides of the first and second panels 926, 928 align to form front and rear ends 914*a*, 914*b* and the left and right sides 930, 932 of the second member 914. The fully-formed second member also defines a left edge 962, a right edge 960, an upper surface 964 and a lower surface 966.

In use, the lower surface 966 defines a running surface that lies parallel to the divider and faces the band.

The first and second panels 926, 928 together create a second recess 980 that defines a second recess region or attachment region 954. The second attachment region 954 is provided at the rear edge 958 of the second member, and is located centrally along a width of the second member 914 defined between its left and right edges 962, 960. The band 916 is attached to the second member 914 at this second attachment region 954 when the arrangement is assembled, which is configured to detachably couple the primary region of the second member 914 to the band 916. As in the other described embodiments, the remainder of the second member 914, surrounding the second attachment region, defines a primary region of the second member 914.

The second recess 980 is defined by the opening 970 in the first panel 926 and a continuous portion of the second panel 928 that overlies the opening 970 when the second member 914 is formed. In this way, the continuous portion of the second panel 928 forms a base 972 of the second recess 980. As with the first recess 900 of the first member 912, the second recess 980 of the second member 914 accommodates an adhesive material (not shown) for coupling the second member 914 to the band 916. The adhesive material lies flush or sub-flush with the lower surface 966 of the second member 914 when accommodated in the second recess 980.

As with the first member 912, a spacing between the lower surface or running surface 966 and the base 972 defines a depth of the recess 980.

It should be understood that although the arrangement of FIGS. 29 to 34 has so far been described as including both first and second members 912, 914, this is not a requirement. In some embodiments, the arrangement may include only one of the first or second members 912, 914. Furthermore, in embodiments in which two members are included these members may be different, for example as is described in the embodiment of FIGS. 29 to 34, or these two members may be substantially the same.

A method of assembling a package incorporating the arrangement of the embodiment of FIGS. 29 to 32 will now be described with reference to FIGS. 33 and 34. In this example, the arrangement of FIGS. 29 to 32 is incorporated into a sleeve such as that illustrated in FIGS. 5 and 6.

In a first step, a sleeve blank 300 such as that shown in FIG. 5 is provided, and the band 916 is arranged to encircle the divider 304 of the sleeve blank 300. To achieve this, the strip of sheet material that forms the band 916 is arranged to encircle the divider 304 of the sleeve blank 300, and the ends of the sheet material are joined to form the band 916 around the divider 304. It should be noted that the divider 304, also referred to as a substrate, may not be integral with a sleeve or other component of the package in all embodiments. In some examples, the divider 304 may simply be a planar sheet of material that can be fixed in a sleeve, for example using an adhesive or some mechanical means, in order to form the package.

With the band 916 in place, the sleeve blank 300 is folded along the folds 332 successively in a coil-like manner, starting with the divider 304, to form a sleeve 218 that includes an upper passage 100 and a lower passage 102.

Figure 33:
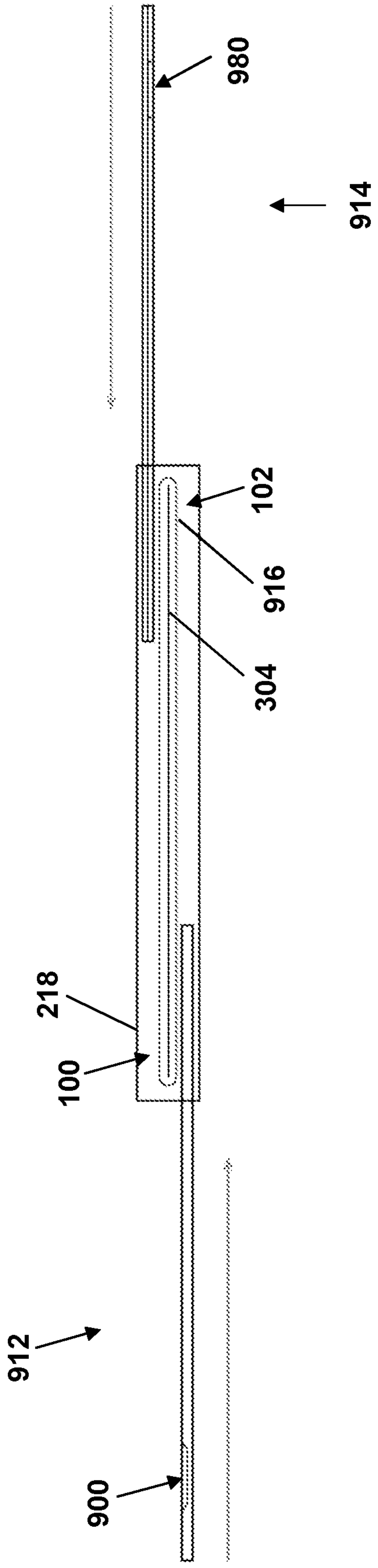
FIG. 33 is a side view of a package, illustrating the moveable members of FIGS. 29 and 32 being inserted into a sleeve of the package.

Referring to FIG. 33, once the sleeve 218 is formed the first and second members 912, 914 are prepared and incorporated into the package as follows.

To prepare the first and second members 912, 914 for integration in the sleeve 218, an adhesive material is arranged in the first recess 900 of the first member 912 and the second recess 982 of the second member 914. The adhesive material is arranged so as to lie flush or sub-flush with the upper surface 936 of the first member 912 and the lower surface 966 of the second member 914, each of which define a running surface of their respective member 912, 914. In use, when the arrangement or package is assembled, the running surface will face the band 916.

Said another way, a depth of the adhesive material in a direction substantially orthogonal to the running surface does not exceed a depth of the respective recess.

Arranging the adhesive material in this way is advantageous, as it guards against the adhesive material transferring to the band 916 or other components of the package before it is intended. In the finished article, it also ensures that the first and second members 912, 914 can lie flat against the divider or substrate 304, without being spaced away from the substrate 304 in the region of the adhesive.

Once the adhesive material is arranged in the recesses of the first and second members 912, 914, the first and second members 912, 914 are inserted into the sleeve 218.

The first member 912 is inserted into the lower passage 102 of the sleeve 218, with the upper surface 936, i.e. the running surface, of the first member 912 facing towards the band 916. In this example, the first member 912 is inserted into the sleeve 218 so that the front end 912*a* of the first member 912 enters the sleeve 218 before the rear end 912*b* of the first member 912. The first member 912 is then pushed into the sleeve 218 until the ends 912*a*, 912*b* of the first member 912 generally align with ends 218*a* of the sleeve 218, as is shown in FIG. 34.

The second member 914 is inserted into the upper passage 100 of the sleeve 218, with the lower surface 966, i.e. the running surface, of the second member 914 facing towards the band 916. In this example, the second member 914 is inserted into the sleeve 218 at the opposing end of the sleeve to that at which the first member 912 is inserted. The second member 914 is inserted into the sleeve 218 such that the front end 914*a* of the second member 914 enters the sleeve 218 before the rear end 914*b* of the second member 914, and is then pushed into the sleeve 218 until the ends 914*a*, 914*b* of the second member 914 align with the ends 218*a* of the sleeve 218, as shown in FIG. 34.

Because the adhesive material lies flush or sub-flush with the running surface 936, 966 of each member 912, 914, the running surface can run smoothly over the band 916, without the adhesive material catching on the band 916 to inhibit movement.

As noted above and as illustrated in FIG. 33, the first and second members 912, 914 are inserted into the sleeve 218 at opposing ends of the sleeve 218 in this example. However, the first and second members 912, 914 may be inserted at the same end of the sleeve 218 in other embodiments. Furthermore, it should be understood that the first and second members 912, 914 may be inserted into the sleeve 218 simultaneously, or may be inserted at different times.

Figure 34:
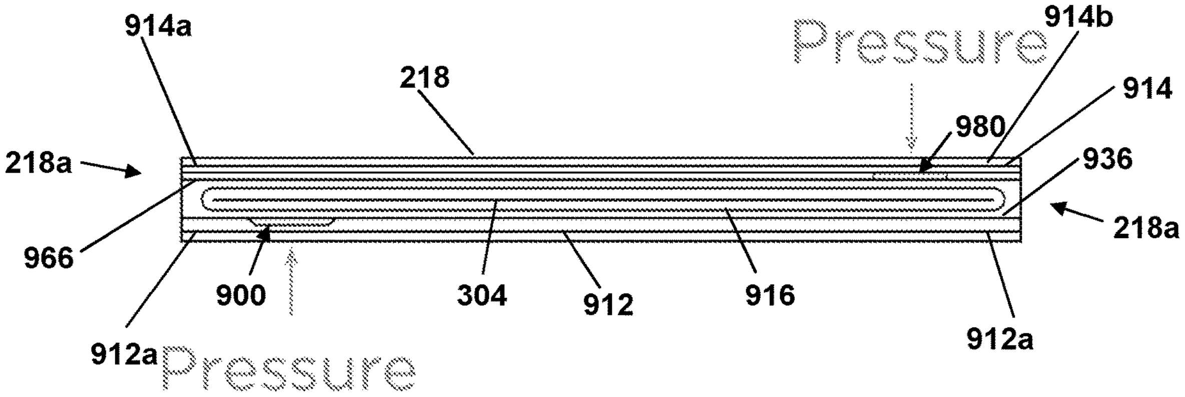
FIG. 34 is a side view of the package of FIG. 33.

Once the first and second members 912, 914 are in position in the sleeve 218, with their ends 912*a*, 912*b*, 914*a*, 914*b* in general alignment with the ends 218*a* of the sleeve 218 as shown in FIG. 34, and their running surfaces 936, 966 lying parallel to and facing the divider 304 and the band 916, the first and second members 912, 914 are ready for attachment to the band 916.

To attach the first member 912 to the band 916, pressure is applied to the band 916 and/or to the first member 912 in the region of the adhesive material, in order to adhere or bond the first member 912 to the band 916. When pressure is applied in this way, for example by a user pressing down on the sleeve 218 in the region of the adhesive material of the first member 912, this pushes the portion of the first member 912 in the vicinity of the adhesive material towards and into contact with the band 916. Continued pressure from the user pushes the adhesive material housed in the first recess 900 of the first member 912 into contact with the band, thereby attaching the first member 912 to the band 916 via the adhesive material.

A similar method may be employed to the second member 914 to attach the second member 914 to the band 916.

It will be understood that the pressure for attaching the first and second members 912, 914 may be applied manually or otherwise. It should also be appreciated that it is not required that pressure be applied directly to the band and/or the first or second members 912, 914. Instead, pressure may be applied to the band 916 and/or the first or second members 912, 914 via another component of the package, i.e. via the sleeve 218 as in the embodiment of FIG. 34.

Furthermore, it should be understood that pressure may be applied to attach the first and second members 912, 914 to the band 916 simultaneously or at different times. As one example, one method of applying this attachment pressure may be for a user to pinch the sleeve 218 between the thumb and forefinger of each hand, such that pressure is applied simultaneously to the band 916 and the first and second members 912, 914 in the region of the adhesive material.

Incorporating the adhesive in the recesses 900, 980 of the first and second members 912, 914 so that it is flush or sub-flush to the running surfaces 936, 966 is advantageous as it ensures that adhesive material does not unintentionally transfer onto other components, or simply before it is intended to. This is especially important in the described example, in which the first and second members 912, 914 are incorporated into the package after the sleeve 218 and the band 916 are already assembled. Transfer of the adhesive material before it is intended in this example could lead to the member 912, 914 attaching to the wrong component, or at the wrong position, which would most likely result in the entire package being discarded. Transfer of adhesive material before intended could also lead to poor operation of the final package. For example, if a small amount of adhesive were to transfer to the band at the wrong position, this could result in less smooth running of the running surface of the member in the package. The invention therefore protects against the unnecessary waste of materials, the loss of time in assembling a package that must ultimately discarded, as well as helping to ensure the good working order of the final package.

Furthermore, in the finished package, because the adhesive material lie flush or sub-flush with the running surface, and does not protrude above the running surface, the adhesive material does not cause the first or second members 912, 914 to be spaced away from the band 916, This means that the first and second members 912, 914 can lie flat against the band 916, with the band 916 lying flat against the divider. This ensures a compact package, and aids smooth running of the band-drive mechanism.

The method described above in relation to FIGS. 33 and 34 is only one example of how a package incorporating the arrangement of FIGS. 29 to 32 could be assembled, and should not be taken as limiting.

In one embodiment, the first and/or second members 912, 914 may be attached to the band 916 before the band 916 is incorporated into a sleeve 218/package. For example, the band 916 could be arranged around a divider in a similar manner to as described above, but in this case the divider may form a separate component rather than being provided as an integral part of the sleeve 218. Once the band 916 is arranged on the divider, the first and/or second members 912, 914 may be attached to the band in a similar manner to that described already. Once assembled, the arrangement may then be incorporated into a sleeve to form the final package. Alternatively, it would be possible for the first and/or second members 912, 914 to be attached to the band 916 before the band 916 is assembled on any sort of divider or substrate.

Variations and modifications of the invention will be apparent to the skilled person that fall within the scope of the appended claims.

The invention claimed is:

1. A package comprising a package insert and a sleeve, the package insert comprising:

first and second members; and a band, the first and second members being coupled to the band such that movement of the first member in a first direction drives the band to cause movement of the second member in a second direction, wherein:

the first member comprises a primary region and an attachment region that is frangibly coupled to the primary region so that the attachment region is detachable from the primary region to decouple the primary region from the band;

a boundary between the attachment region and the primary region is defined by a perforation;

a portion of the band is attached to the attachment region to couple the first member to the band, wherein said portion of the band extends over a majority of the attachment region; and wherein the package insert is housed within the sleeve, such that the sleeve is arranged to selectively block access to the first member.

2. The package of claim 1, wherein the attachment region is configured to be detachable from the band.

3. The package of claim 2, wherein the first member is movable between a closed configuration in which the first member has been displaced in the first direction to a minimum possible extent and an open position in which the first member has been displaced in the first direction to a maximum possible extent, and wherein the attachment region is configured to be detachable from one or both of the band and the primary region when the package is arranged in the open configuration and a force is applied to the first member in the first direction.

4. The package of claim 1, wherein the attachment region is fitted to the primary region with a press-fit.

5. The package of claim 2, wherein the attachment region comprises an attachment feature for detachably coupling the first member to the band.

6. The package of claim 5, wherein the attachment feature comprises an opening and an anchoring feature adjacent to the opening, wherein an end of the band protrudes through the opening to define an attachment loop, and wherein the anchoring feature protrudes into the attachment loop.

7. The package of claim 6, wherein the anchoring feature comprises a flap.

8. The package of claim 7, wherein the first member comprises a double wall, the flap being provided on a first wall of the double wall and the opening being defined in a second wall of the double wall.

9. The package of claim 8, wherein the flap is defined by a hinged portion of the first wall.

10. The package of claim 1, wherein the second member comprises an attachment region that is detachably coupled to the band.

11. The package of claim 1, wherein the first member and the band are made of different materials, optionally materials that have different recycling categories.

12. The package of claim 1, wherein the band comprises a plastics material and the first member comprises a non-plastics material.

13. The package of claim 1 further comprising a panel, wherein the band encircles the panel.

14. The package of claim 1, wherein one or both of the first member and the second member comprises a recess for accommodating an adhesive material for coupling the one or both of the first member and the second member to the band.

* * * * *